United States Patent
Dev et al.

(10) Patent No.: US 10,111,119 B2
(45) Date of Patent: Oct. 23, 2018

(54) METHODS FOR PERFORMING RADIO MEASUREMENTS AND MOBILE TERMINAL DEVICES

(71) Applicant: Intel IP Corporation, Santa Clara, CA (US)

(72) Inventors: Rishav Dev, Bangalore (IN); Mahammad Gous Shaikh, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 89 days.

(21) Appl. No.: 14/930,702

(22) Filed: Nov. 3, 2015

(65) Prior Publication Data
US 2017/0127305 A1    May 4, 2017

(51) Int. Cl.
| | |
|---|---|
| *H04L 1/00* | (2006.01) |
| *H04W 24/08* | (2009.01) |
| *H04W 24/10* | (2009.01) |
| *H04L 5/00* | (2006.01) |

(52) U.S. Cl.
CPC .......... *H04W 24/08* (2013.01); *H04W 24/10* (2013.01); *H04L 5/0073* (2013.01)

(58) Field of Classification Search
CPC .. H04W 24/08; H04W 52/0212; H04L 5/0073
See application file for complete search history.

(56) References Cited

U.S. PATENT DOCUMENTS

| | | | | |
|---|---|---|---|---|
| 2012/0264425 A1* | 10/2012 | Krishnamoorthy | ... | H04W 48/16 455/434 |
| 2014/0036710 A1* | 2/2014 | Chin | ..... | H04W 24/10 370/252 |

(Continued)

FOREIGN PATENT DOCUMENTS

| | | |
|---|---|---|
| EP | 2512195 A1 | 10/2012 |
| WO | 2015105813 A2 | 7/2015 |

OTHER PUBLICATIONS

European Search Report based on Application No. 16192484.0 (10 pages) dated Feb. 13, 2017 (Reference Purpose Only).

*Primary Examiner* — Abdelnabi O Musa
(74) *Attorney, Agent, or Firm* — Viering, Jentschura & Partner mbB

(57) ABSTRACT

A mobile terminal device may include a first SIM, a second SIM, a radio processing circuit and a baseband processing circuit configured to interact with the radio processing circuit. The baseband processing circuit may be configured to identify one or more first measurement targets of a first radio measurement of the first SIM, identify one or more common measurement results from one or more measurement results of a second radio measurement of the second SIM, wherein at least one of the one or more common measurement results corresponds to a measurement target of the one or more first measurement targets of the first radio measurement, provide the one or more common measurement results to the first radio measurement as one or more measurement results of the first radio measurement, and perform mobility operations with the one or more measurement results of the first radio measurement or the one or more measurement results of the second radio measurement.

24 Claims, 12 Drawing Sheets

(56) References Cited

U.S. PATENT DOCUMENTS

| | | | | |
|---|---|---|---|---|
| 2014/0146732 A1* | 5/2014 | Olufunmilola | ....... | H04W 24/10 370/311 |
| 2015/0079985 A1* | 3/2015 | Vuchula | ................ | H04W 48/16 455/435.1 |
| 2015/0126187 A1* | 5/2015 | Ponukumati | .......... | H04W 72/02 455/434 |
| 2015/0296364 A1 | 10/2015 | Peruru et al. | | |

* cited by examiner

METHODS FOR PERFORMING RADIO MEASUREMENTS AND MOBILE TERMINAL DEVICES

TECHNICAL FIELD

Various embodiments relate generally to methods for performing radio measurements and mobile terminal devices.

BACKGROUND

Mobile terminals with multiple Subscriber Identity Modules (SIMs) have increased in popularity in recent years. The complexity of multi-SIM designs may depend on the flexibility in operation desired for each included SIM. For example, multi-SIM designs known as Single Receive Dual-SIM Dual-Standby (SR-DSDS) may incorporate two separate SIMs but may only provide a single transceiver system. As a result, only one SIM may be able to actively transmit and receive voice or packet data at a given time. Both SIMs may still be able to operate passively (hence "standby") and may utilize a time-multiplexing scheme in which both SIMs alternatively share use of the transceiver.

Dual-Receive Dual-SIM Dual-Standby (DR-DSDS) designs may allow both SIMs to concurrently receive data by incorporating two separate receiver subsystems (i.e. receive chain). Each SIM may thus be granted exclusive use of one of the receiver subsystems and accordingly may receive data without interruption from the other SIM. However, DR-DSDS designs may provide only a single transmitter subsystem, and a result only one SIM may be able to transmit data at a given time.

Dual-SIM Dual-Active (DSDA) designs may expand on DR-DSDS multi-SIM designs by providing two separate transceiver systems. Each SIM may thus be granted exclusive access to one of the transceiver systems and may be able to both transmit and receive data independently in parallel with the other SIM.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
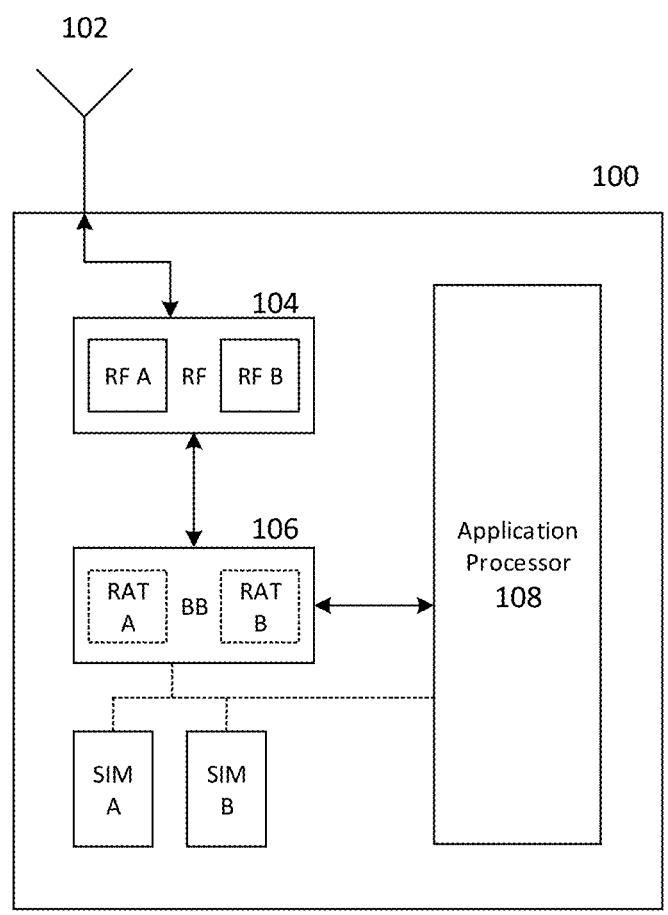
FIG. 1 shows a block diagram illustrating an internal configuration of a mobile terminal.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

As used herein, a "circuit" may be understood as any kind of logic implementing entity (analog or digital), which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the terms "transmit" and "send" encompass both direct and indirect transmission and sending. Similarly, the term "receive" encompasses both direct and indirect reception unless explicitly specified. As utilized herein, the term "derived from" designates being obtained directly or indirectly from a specific source. Accordingly, data derived from a source includes data obtained directly from the source or indirectly from the source, i.e. through one or more secondary agents.

Dual-Receive Dual-SIM-Dual-Standby (DR-DSDS) and Dual-SIM Dual-Active (DSDA) designs for multi-SIM mobile terminals may each incorporate two separate receiver subsystems. As a result, DR-DSDS and DSDA mobile terminals may be able to concurrently receive a separate data stream for each SIM.

A baseband modem (or collection of baseband modems dependent on the specifics of each multi-SIM design) may thus be able to support a separate mobile network connection for each SIM, which may include performing various intra-frequency, inter-frequency, and inter-RAT (radio access technology) radio measurements. A multi-SIM mobile terminal may reduce power consumption and improve radio measurement speed by coordinating radio measurements and sharing measurement results between RATs of each SIM that are equivalent. Accordingly, a baseband modem may include a measurement management entity to coordinate radio measurements between certain protocol layers of each RAT.

FIG. 1 shows a block diagram illustrating an internal configuration of mobile terminal 100. Mobile terminal 100 may be a multi-SIM mobile terminal, and accordingly may include at least SIMA and SIMB. It is appreciated that mobile terminal 100 may additionally include a third SIM SIMC, a fourth SIM SIMD, etc., and that the operations detailed herein may be similarly applied to further SIMs in an analogous manner, such as by sharing measurement results between more than two SIMs.

As illustrated in FIG. 1, mobile terminal 100 may include antenna 102, radio frequency (RF) transceiver 104, baseband modem 106, application processor 108, SIMA, and SIMB. As shown in in FIG. 1, the aforementioned components of mobile terminal 100 may be implemented as separate components. However, it is appreciated that the architecture of mobile terminal 100 depicted in FIG. 1 is for purposes of explanation, and accordingly one or more of the aforementioned components of mobile terminal 100 may be integrated into a single equivalent component or divided into two separate components with collective equivalence. It is understood that mobile terminal 100 may have one or more additional components, such as additional hardware, software, or firmware elements. For example, mobile terminal 100 may further include various additional components including processors/microprocessors, controllers/microcontrollers, memory, other specialty or generic hardware/processors/circuits, etc., in order to support a variety of additional operations. Mobile terminal 100 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

It is appreciated that the aforementioned components of mobile terminal 100, in particular, RF transceiver 104, baseband modem 106, and application processor 108, may be implemented in a number of different manners, such as by hardware, firmware, software executed on hardware (e.g. a processor), or any combination thereof. Various options include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed, in an aspect of the disclosure mobile terminal 100 may be a mobile terminal device comprising a first SIM (SIMA), a second SIM (SIMB), a radio processing circuit (RF transceiver 104) and a baseband processing circuit (baseband modem 106) adapted to interact with the radio processing circuit. The baseband processing circuit may be configured to provide one or more first measurement targets of a first radio measurement of a first SIM, identify one or more common measurement results from one or more measurement results of a second radio measurement of the second SIM, wherein at least one of the one or more common measurement results corresponds to a measurement target of the one or more first measurement targets of the first radio measurement, provide the one or more common measurement results to the first radio measurement as one or more measurement results of the first radio measurement, and perform mobility operations with the one or more measurement results of the first radio measurement or the one or more measurement results of the second radio measurement. In a further aspect of the disclosure, the baseband processing circuit may be configured to provide one or more first inter-RAT measurement targets of a first radio measurement of a master RAT of the first SIM, identify one or more common measurement results from one or more measurement results of a second radio measurement of a second SIM, wherein at least one of the one or more common measurement results corresponds to an inter-RAT measurement target of the one or more first measurement targets of the first radio measurement, provide the one or more common measurement results to the first radio measurement as one or more inter-RAT measurements results of the first radio measurement, and perform mobility operations with the one or more measurement results of the first radio measurement or the one or more measurement results of the second radio measurement.

In an abridged overview of the operation of mobile terminal 100, mobile terminal 100 may be configured to receive and/or transmit wireless signals according to multiple different wireless access protocols or radio access technologies (RATs), including any one of, or any combination of, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The RAT capabilities of mobile terminal 100 may be determined by one or more Subscriber Identity Modules (SIM) included in mobile terminal 100, such as SIMA and SIMB.

Further to the abridged overview of operation of mobile terminal 100, RF transceiver 104 may receive radio frequency wireless signals via antenna 102, which may be implemented as e.g. a single antenna or an antenna array composed of multiple antennas. As previously indicated, mobile terminal 100 may operate according to a DSDA or DR-DSDS multi-SIM design. Accordingly, RF transceiver 104 may include two separate receiver subsystems RFA and RFB in addition to at least one transmitter subsystem (e.g. one transmitter subsystem for DR-DSDS or two transmitter subsystems for DSDA, not explicitly shown in FIG. 1). Receiver subsystems RFA and RFB of RF transceiver 104 may include various reception circuitry elements, which may include e.g. analog circuitry, configured to process externally received signals, such as mixing circuitry to convert externally received RF signals to baseband and/or intermediate frequencies. Receiver subsystems RFA and RFB of RF transceiver 104 may also include amplification circuitry to amplify externally received signals, such as power amplifiers (PAs) and/or Low Noise Amplifiers (LNAs), although it is appreciated that such components may also be implemented separately. RF transceiver 104 may additionally include at least one transmitter subsystem (not explicitly shown in FIG. 1), which may include various transmission circuitry elements configured to transmit internally received signals, such as e.g. baseband and/or intermediate frequency signals provided by baseband modem 106, which may include mixing circuitry to modulate internally received signals onto one or more radio frequency carrier waves and/or amplification circuitry to amplify internally received signals before transmission. The at least one transmitter subsystem of RF transceiver 104 may provide such signals to antenna 102 for wireless transmission. Further references herein to reception and/or transmission of wireless signals by mobile terminal 100 may thus be understood as an interaction between antenna 102, RF transceiver 104 (including RFA, RFB, and the at least one transmitter subsystem), and baseband modem 106 as detailed above. Although not explicitly depicted in FIG. 1, RF transceiver 104 may be additionally be connected to application processor 108.

For purposes of explanation, RFA may be assigned to SIMA and RFB may be assigned to SIMB. Accordingly, RFA may perform reception procedures for SIMA while RFB may perform reception procedures for SIMB, e.g. by receiving and processing radio frequency signals for SIMA and SIMB, respectively, and providing resulting baseband signals to baseband modem 106 for further processing in accordance with the radio access technology protocols for SIMA and SIMB. The at least one transmitter subsystem of RF transceiver 104 may perform transmission procedures for both SIMA and SIMB, which may operate on a time-sharing basis (e.g. DR-DSDS) or a concurrent parallel operation basis (e.g. DSDA).

Similarly, baseband modem 106 may include at least two separate radio access technology (RAT) interfaces RATA and RATB. It is appreciated that baseband modem 106 may be realized as multiple separate baseband modem components, such as separate baseband modems for each supported RAT of SIMA and SIMB. Alternatively, baseband modem 106 may e.g. by realized as two separate baseband modems, e.g. a first baseband modem for SIMA and a second baseband modem for SIMB, where the first and second baseband modems support each supported RAT of SIMA and SIMB (e.g. single-RAT or multi-mode depending on the RAT capabilities of each of SIMA and SIMB). Alternatively, baseband modem 106 may be realized as a single baseband modem capable of supporting multiple SIMs and multiple RATs in accordance with the RAT capabilities of SIMA and SIMB.

As will be detailed, each RAT interface RATA and RATB may be composed of hardware, software, and/or firmware components, which may be physically dedicated to one of SIMA or SIMB or shared between SIMA and SIMB. For purposes of explanation, RATA may be correspond to the master and slave (if any) RAT interfaces of SIMA and RATB may correspond to the master and slave (if any) RAT interfaces of SIMB. As used herein, the term "interface" refers to the upper protocol stack (Layer 2 and Layer 3) and physical (Layer 1) layers for a radio access technology (RAT). RAT interface RATA may therefore include the RAT interfaces supported by SIMA, i.e. may be composed of the upper protocol stack and physical layers for each RAT supported by SIMA. Similarly, RAT interface RATB may be composed of the upper protocol stack and physical layers supported by SIMB. Such will subsequently be explained in further detail.

RAT interfaces RATA and RATB may control mobile communication operations of mobile terminal 100 as specified by SIMA and SIMB. For example, RATA and RATB may directly or indirectly control operation of antenna 102, RFA and RFB (respectively), and the at least one transmitter subsystem of RF transceiver 104 to transmit and receive mobile communication data for SIMA and SIMB. Specifically, RAT interfaces RATA and RATB may control mobile communication operations in accordance with Layers 1-3 of the one or more RATs supported by each of SIMA and SIMB.

SIMA and SIMB may each support one or more RATs. In an exemplary configuration, SIMA may support GSM, UMTS, and LTE, while SIMB may only support GSM. RAT interface RATA may therefore be composed of RAT interfaces for GSM, UMTS, and LTE, while RATB may only be composed of a RAT interface for GSM. Dependent on the current state of mobile terminal 100, one RAT of RAT interface RATA may assume a master RAT role while the remaining RATs may assume a slave RAT role (which may change over time). Further to the exemplary configuration, the LTE interface of RATA may assume the master RAT role at an arbitrary time while the GSM and UMTS interfaces of RATA may assume slave RAT roles. As SIMB only supports GSM, the GSM interface of RATB may maintain the master RAT role.

Figure 2:
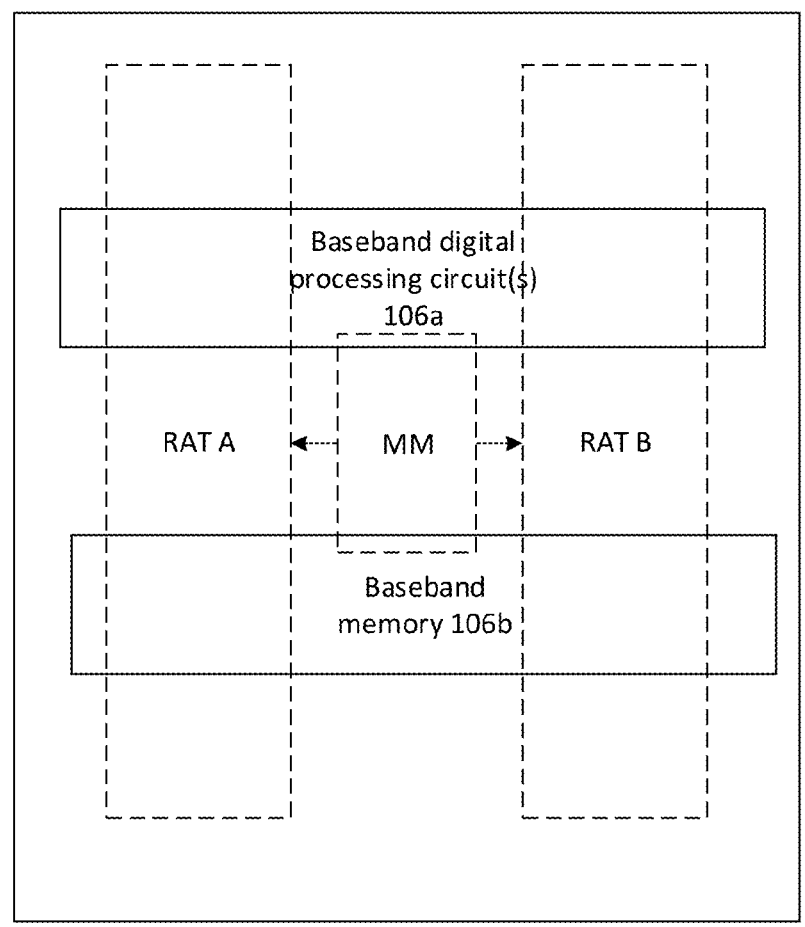
FIG. 2 shows a block diagram illustrating an internal configuration of a baseband modem.

As shown in FIG. 2, baseband modem 106 may be structurally composed of baseband digital processing circuit(s) (one or more) 106a and baseband memory 106b. Although not explicitly shown in FIG. 2, baseband modem 106 may additionally include one or more analog processing circuits.

Digital processing circuit(s) 106a may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) 106a may include hardware, software, or a combination of hardware and software. Specifically, digital processing circuit(s) 106a of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 106 may be detailed herein in terms of functional operation with recognition that a person of skill in the art will readily appreciate the various possible structural realizations of baseband modem 106 using digital processing circuitry that will provide the desired functionality.

Baseband memory 106b may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. Baseband memory 106b may be configured to store software elements, e.g. program code, which may be retrieved and executed using a processor component of digital processing circuit(s)

106a. Although depicted as a single component in FIG. 1, baseband memory 106b may be implemented as one or more separate components in baseband modem 106. Baseband memory 106b may also be partially or fully integrated with digital processing circuit(s) 106a.

As previously indicated, RATA and RATB may be composed of the upper protocol stack (Layer 2 and 3) and physical (Layer 1) layers for one or more RAT interfaces, where RATA and RATB may control mobile communication operations of mobile terminal 100 in accordance with the upper protocol stack and physical layers for each RAT interface. Accordingly, RAT interfaces RATA and RATB may be structurally composed of hardware, software, and/or firmware elements to control and execute mobile communication operations. As shown in FIG. 2, RATA, RATB, and MM (as will be subsequently introduced) may be composed of circuitry and memory components of baseband digital processing circuit(s) 106a and baseband memory 106b.

For example, each of RAT interfaces RATA and RATB may include a control circuit of baseband digital processing circuit(s) 106a configured to retrieve (e.g. from baseband memory 106b) and execute program code (e.g. software) corresponding to the upper protocol stack and physical layer software modules for each RAT interface in order to control transmission and reception of mobile communication data. The control circuit may be e.g. a microprocessor or microcontroller such as e.g. a protocol processor configured to retrieve and execute program code for upper protocol stack and physical layer software modules. Each of RAT interfaces RATA and RATB may also include other digital processing circuits of baseband digital processing circuits 106a, which the control circuits may control in order to perform various signal processing operations in accordance with the individual RAT interfaces of RATA and RATB.

As previously indicated, each of RAT interfaces RATA and RATB may include a master RAT and potentially one or more slave RATs according to the RAT capabilities of SIMA and SIMB. Returning to the exemplary configuration introduced above, SIMA may support GSM, UMTS, and LTE operation while SIMB may only support GSM operation. Accordingly, RATA may include upper protocol stack and physical layers for each of GSM, UMTS, and LTE, while RATB may only include upper protocol stack and physical layers for GSM. The respective control circuits of RATA and RATB may therefore retrieve and execute upper protocol stack and physical layer software modules to control mobile communication operations in accordance with the individual RAT interfaces of RATA and RATB. It is appreciated that the control circuits may be unified or discrete relative to RATA and RATB. For example, a single processor of baseband digital processing circuit(s) 106a may execute the upper protocol stack and physical layers for each RAT of RATA and RATB, such as a single processor executing the LTE interface of RATA as the master RAT of RATA, the GSM interface of RATB as the master RAT of RATB, and the UMTS and GSM interfaces of RATA as the slave RATs of RATA, e.g. as software modules. Alternatively, individual processors of baseband digital processing circuit(s) 106a may each execute the upper protocol stack and physical layers for a single RAT of RATA and RATB, e.g. as software modules. Alternatively, a first processor baseband digital processing circuit(s) 106a may execute the upper protocol stack and physical layers for each RAT of RATA while a second processor of baseband digital processing circuit(s) 106a may execute the upper protocol stack and physical layers for each RAT of RATB. Each processor may then control one or more digital processing circuits of baseband digital processing circuit(s) 106a in order to perform a variety of signal processing operations in accordance with the protocols of each RAT. Many such variations are recognized as viable and are accordingly embraced herein.

It is thus appreciated that baseband digital processing circuit(s) 106a and baseband memory 106b may be configured to execute each of the master and slave RATs of RATA and RATB, where a single respective RAT of RATA and RATB assumes a master RAT role and the remaining respective RATs (if any) of RATA and RATB assume a slave RAT role. Accordingly, RAT interfaces RATA and RATB of baseband modem 106 may execute control directly or indirectly over operation of baseband modem 106, receiver subsystems RFA and RFB of RF transceiver 104, the at least one transmitter subsystem of RF transceiver 104, and antenna 102 in order to support mobile communication operations for SIM1 and SIM2. Each of RAT interfaces RATA and RATB may have a single RAT interface assume a master RAT role at any given time, where the remaining RATs (if any) may assume a slave RAT role. The master RAT may assume primary control of mobile communication resources while the slave RATs remain in a passive state. Depending on the status of mobile terminal 100, the RAT interface assuming the master RAT role may change over time.

The respective master RAT interfaces of RATA and RATB, herein referred to as RATA master and RATB master, may thus oversee a variety of mobile communication operations of mobile terminal 100 according to the respective upper protocol stack and physical layers of each master RAT interface. In particular, one such operation may include radio measurements in which a master RAT (RATA master or RATB master) may measure one or more detectable cells on one or more target carrier frequencies. Such measurements may include receiving a communication signal and performing processing on the communication signal to measure a characteristic of the signal, including signal power, signal quality, or signal strength measurements. A master RAT may perform such measurements as a part of mobility procedures such as e.g. cell selection, cell reselection, handover, measurement reporting, network scan (e.g. Public Land Mobile Network Scan), which may be triggered according to various criteria designated by the respective RAT interface layers. Radio measurements may be either intra frequency measurements (measurements on the same carrier frequency as the current serving cell of the master RAT), inter-frequency measurements (measurements on different carrier frequencies from the carrier frequency of the current serving cell), or inter-RAT measurements (measurements on a different RAT). Such radio measurements may be performed when a master RAT is in both radio idle state and radio connected state, such as with measurement gaps (radio connected state) or a Discontinuous Reception (DRX) cycle (radio idle and connected state).

Each RAT interface may perform the radio measurements using certain digital processing circuits of the one or more baseband digital processing circuits 106a. The specific type of radio measurements may vary depending on each the radio access technology of each RAT interface. For example, a GSM interface may perform Received Strength Signal Indicator (RSSI) measurements by processing received communication signals at a processing circuit in order to obtain one or more measurement values. A UMTS interface may perform Received Signal Code Power (RSCP), Energy per Chip over Noise (EcNo), and RSSI measurements by processing received communication signals at a processing circuit in order to obtain one or more measurement values.

An LTE interface may perform Reference Signal Received Power (RSRP), Reference Signal Received Quality (RSRQ), and RSSI measurements by processing received communication signals at a processing circuit in order to obtain one or more measurement values. The measurements may include serving cell measurements, neighbor cell measurements, network scans (e.g. Public Land Mobile Network (PLMN) scans), and/or any other type of radio measurement in which a received signal is processed in order to measure a characteristic of the received signal. The radio measurements may include measurements in which a single cell is measured, such as by measuring a cell using a physical identity of a cell, or in which one or more carrier frequencies are measured, such as by detecting measuring multiple cells on one or more carrier frequencies.

The dual reception multi-SIM design (DR-DSDS, DSDA, etc.) of mobile terminal 100 may allow both RATA master and RATB master to perform radio measurements without interruption, i.e. without disturbance from the other RAT interface. However, in order to reduce power consumption and improve radio measurement speed, baseband modem 106 may coordinate radio measurements and share measurement results between RAT interfaces RATA and RATB, such as by using a measurement manager MM as shown in FIG. 2. RATA and RATB may utilize MM in order to request and retrieve measurement results from one another as well as to coordinate radio measurement execution in order to effectively perform radio measurements in a synchronized manner.

Returning to the exemplary configuration introduced above, SIMA may be a multi-RAT SIM that supports LTE, UMTS, and GSM, while SIMB may be a GSM-only SIM. Accordingly, RATA may support LTE, UMTS, and GSM interfaces in various master-slave RAT roles while RATB may maintain a GSM interface in a master RAT role.

The master RAT interface for RATB, i.e. the RATB GSM master, may perform various intra- and inter-frequency measurements for GSM, which may be triggered and utilized for different mobility procedures. As RATA may support multiple RAT interfaces, RATA master may perform inter-RAT measurements in addition to intra- and inter-frequency measurements. Accordingly, in a scenario where the LTE interface has assumed the master role for RATA (i.e. RATA LTE master), the RATA LTE master may temporarily hand control of the receiver resources of mobile terminal 100 to either the RATA GSM slave and/or the RATA UMTS slave to allow the slave RAT interfaces to perform radio measurements or GSM or UMTS, respectively. The RATA GSM/UMTS slave may then perform the radio measurements and report back the resulting inter-RAT measurements to the RATA LTE master, which may use the inter-RAT measurements for mobility procedures, such as a potential inter-RAT reselection/handover (e.g. dependent on the inter-RAT measurements and any relevant serving cell measurements).

Accordingly, the intra- and inter-frequency measurements performed by the RATB GSM master may be relevant for the inter-RAT measurements performed by the RATA LTE master, in particular the GSM inter-RAT measurements obtained by the RATA LTE master by allotting control of receiver resources to the RATA GSM slave. Accordingly, RATA and RATB may share measurement results in order to reduce power consumption and improve radio measurement completion time.

For example, the RATA LTE master may trigger inter-RAT measurements, such as part of mobility procedures in either a radio connected state or radio idle state. The RATA LTE master may send an inter-RAT measurement request to the RATA GSM slave to perform the inter-RAT measurements and report the inter-RAT measurement results back to the RATA LTE master. The RATA GSM slave may have a first set of target carrier frequencies to measure during inter-RAT measurements as triggered by the RATA LTE master. Independently of the inter-RAT procedure of RATA, the RATB GSM master may additionally perform intra- and/or inter-frequency measurements in accordance with mobility procedures. Accordingly, the RATB GSM master may additionally have a second set of target carrier frequencies to measure during the intra- and/or inter-frequency measurements, where one or more target carrier frequencies are common to both the first and second sets of target carrier frequencies, i.e. common target carrier frequencies. Accordingly, as opposed to performing two separate radio measurements on each of the common target carrier frequencies (i.e. a first measurement by RATA GSM slave during inter-RAT measurements triggered by RATA LTE master and a second measurement by RATB GSM master during intra- and/or inter-frequency measurements), only one of RATA or RATB may perform the GSM radio measurements and provide the measurements results to the other of RATA and RATB.

Baseband modem 106 may therefore include measurement manager MM, which may interact with RATA and RATB as shown in FIG. 2 in order to coordinate radio measurements and share measurement results between RATA and RATB. Such sharing of measurements results may reduce power consumption and improve radio measurement speed.

Figure 3:
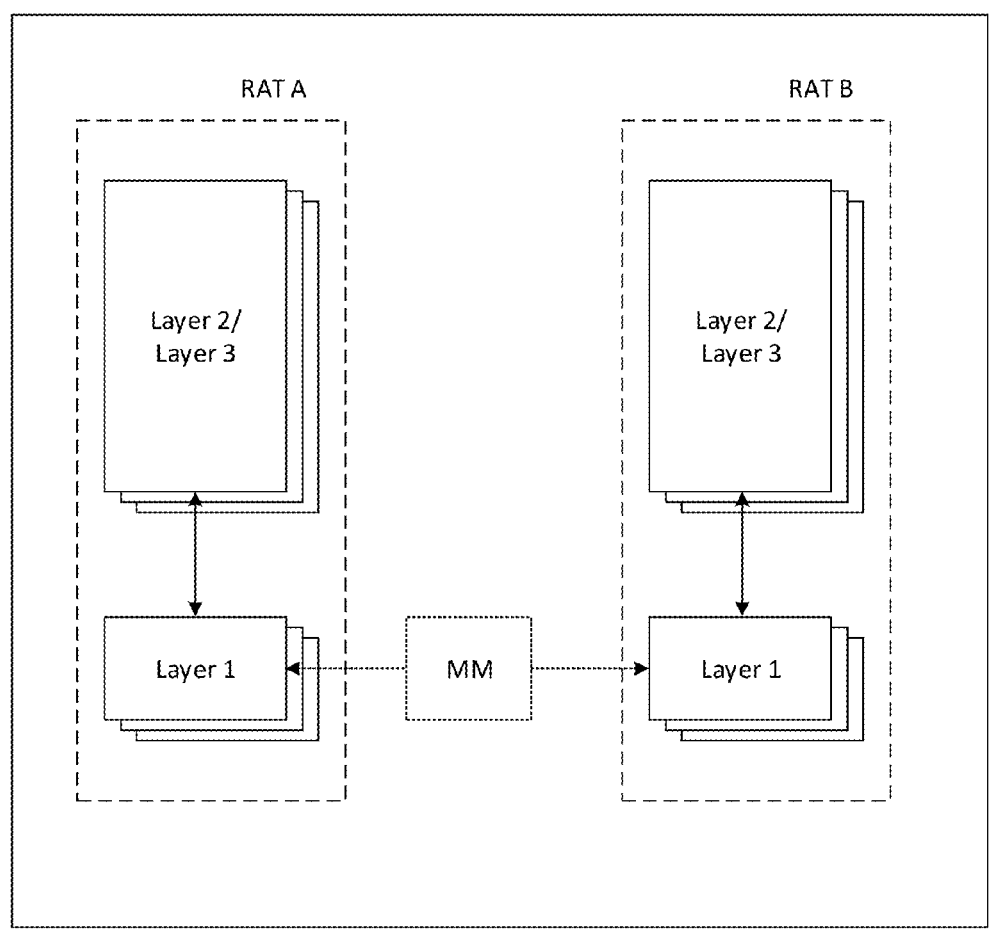
FIG. 3 shows a block diagram illustrating an internal configuration master and slave RATs within a baseband modem.

FIG. 3 shows a block diagram illustrating the layer architecture of the upper protocol stack and physical layers of RAT interfaces RATA and RATB in addition to measurement manager MM. As previously indicated, each of RAT interfaces RATA and RATB may be composed of the upper protocol stack (Layer 2 and Layer 3) and physical (Layer 1) layers of one or more RATs, e.g. depending on the RAT capabilities of SIMA and SIMB. It is appreciated that each of RATA and RATB may have a number of upper protocol stack and physical layer sets corresponding to the number of RATs supported by SIMA and SIMB respectively.

The upper protocol stack and physical layers for each of RATA and RATB may correspond to software modules executed on a processor (e.g. one or more control circuit of baseband digital processing circuit(s) 106a) in addition to one or more digital processing circuits of baseband digital processing circuit(s) 106a configured to perform signal processing operations. As shown in FIG. 3, measurement manager MM may act as an interconnect between the respective physical layers of RATA and RATB. MM may thus similarly be structurally implemented as software, such as program code corresponding to a software module defining the operation of MM. MM may similarly be executed by a control circuit (or processor) of baseband digital processing circuit(s) 106a, and may be configured to interact with the upper protocol stack and physical layers of each master and slave RAT of RATA and RATB in order to coordinate radio measurements and share measurement results.

Each of RATA and RATB may perform radio measurements at the physical layer, i.e. Layer 1 or "L1", and accordingly MM may be able to retrieve and provide relevant measurement results between the RATA L1 and RATB L1. It is appreciated that the L1s for the individual RATs of RATA, i.e. each of the master and slave RAT physical layers, may be implemented separately, i.e. stored and executed as separate software modules, and that RATB may have an analogous architecture. It is thus appreciated that MM may be connected to each available L1 layer for both of RATA and RATB, and accordingly may be able to coordinate and share radio measurements across multiple different RATs.

MM may thus be a software module configured to perform data organization procedures. For example, MM may be configured to access measurement results obtained from the respective master and slave RATs of RATA and RATB, and may be configured to identify the measurement target (such as cell identity or carrier frequency) that was measured to obtain the each measurement result. Such may include comparing identity information of a measurement target to each measurement target of a plurality of measurement results to identify matching measurement targets. MM may also be configured to retrieve certain measurement results, such as by retrieving certain measurement results that correspond to a measurement target of interest. MM may be configured to receive such measurement results from one or more layers of the master and slave RAT interfaces of RATA and RATB, and may be configured to provide retrieved measurement results to another layer of the master and slave RAT interfaces of RATA and RATB. Such data organization procedures are understood as conventional and will be appreciated by those of skill in the art.

The functionality of MM will now be described relative to several exemplary scenarios. Returning to the exemplary configuration introduced above, SIMA may support LTE, UMTS, and GSM, while SIMB may only support GSM. Accordingly, RATA may include LTE, UMTS, and GSM upper protocol stack and physical layers (discrete or unified with one another), while RATB may only include GSM upper protocol stack and physical layers. The LTE interface may assume the master RAT role for RAT interface RATA while the GSM and UMTS interfaces may assume slave RAT roles for each of the following exemplary scenarios. The GSM interface may assume the master RAT role for RAT interface RATB.

Figure 4:
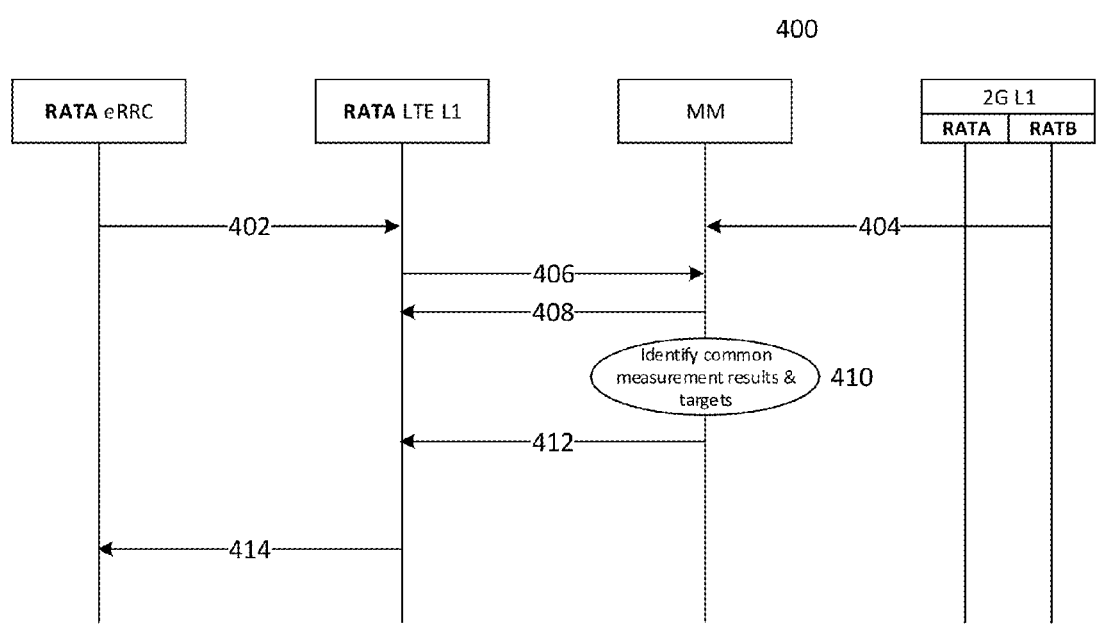
FIG. 4 shows a message sequence chart illustrating the operation of a measurement manager in a first exemplary scenario.

FIG. 4 shows message sequence chart 400 illustrating the operation of MM. In the exemplary scenario of message sequence chart 400, RATA LTE master may trigger inter-RAT measurements. Accordingly, the evolved Radio Resource Control (eRRC) entity of the Layer 3 protocol stack layer of the RATA LTE master (RATA LTE eRRC) may transmit an inter-RAT measurement request 402 to the Layer 1 physical layer of the RATA LTE master (RATA LTE L1). Inter-RAT measurement request 402 may request inter-RAT measurements be performed for GSM. In a conventional scenario, RATA LTE L1 may signal the RATA GSM slave (e.g. RATA GSM Layer 1) to perform radio measurements. However, RATA LTE L1 may instead transmit radio measurement request 406 to measurement manager MM. Radio measurement request 406 may contain a first set of measurement targets, which may include one or more GSM carrier frequencies and/or one or more specific GSM cells (e.g. as identified by cell identification information) for which radio measurements are desired.

Upon receipt of the inter-RAT measurement request 406, MM may transmit an initial confirmation 408 to RATA LTE L1 indicating confirmation of measurement request 406. MM may then determine whether any measurement results for the first set of measurement targets are available. Specifically, MM may determine whether RATB GSM L1 has previously performed radio measurement on any of the first set of measurement targets.

RATB GSM L1 may have previously performed radio measurements on a second set of measurement targets, which may include one or more GSM carrier frequencies and/or one or more specific GSM cells (e.g. as identified by cell identification information). For example, RATB GSM L1 may have previously performed intra- and/or inter-frequency measurements on each of the GSM carrier frequencies and/or specific GSM cells of the second set of measurement targets, such as according to e.g. a DRX cycle measurement pattern (as will be later detailed). Accordingly, RATB GSM L1 may have previously transmitted a measurement report 404 containing measurement results for the second set of measurement targets to MM.

MM may then compare the first set of measurement targets of 406 to the second set of measurement targets of 404 (or e.g. the measurement targets corresponding to the measurement results provided in 404) to identify if any common measurement targets exist at 410, i.e. if any measurement targets are included in both the first and second sets of measurement targets.

After identifying any common measurement targets based on 404 and 406 at 410, MM may identify any corresponding common measurement results at 410, which may each be e.g. radio measurements identifying a received signal characteristic of a given GSM cell such as e.g. signal power, signal quality, or a signal strength indicator. MM may then transmit a measurement report 412 containing any corresponding common measurement results to RATA LTE L1.

In the exemplary scenario of message sequence chart 400, each of the first set of measurement targets requested in 406 may be included in the second set of measurement targets reported in 404, i.e. each of the first measurement targets may be a common measurement target. Accordingly, MM may provide a measurement report 412 that contains measurement results for each of the first set of measurement targets. RATA LTE L1 may thus receive measurement report 412 and transmit inter-RAT measurement report 414 to RATA LTE eRRC containing the inter-RAT measurements for GSM. As the first set of measurement targets were included in the second set of measurement targets, RATA LTE L1 may not need to hand control to RATA GSM L1 (RATA GSM slave) to perform the inter-RAT measurements. All reception resources for RATA, including RATA GSM, RATA UMTS, and RATA LTE, at baseband modem 106 may thus remain in inactive as opposed to becoming activated to perform the inter-RAT measurements, thus conserving power. Additionally, RATA GSM reception resources may not have to perform any reception or processing of wireless signals, which may be a time-consuming procedure. In contrast, measurement results for the first set of measurement targets may already be available. Accordingly, radio measurement completion time may be reduced, which may accelerate mobility procedures. For example, RATA may be able to perform any necessary inter-RAT cell reselection/handover (e.g. from LTE to GSM) at an earlier point in time due to the expedited receipt of the inter-RAT measurements.

It is appreciated that alternative architectures are additionally possible. For example, MM may locally store the actual measurement results provided by e.g. RATB GSM L1 and subsequently provide the actual measurement results to e.g. RATA LTE L1 upon request. Alternatively, RATB GSM L1 may transmit a measurement report 404 that only contains the carrier frequency and/or cell identify information of each measured cell for which RATB GSM L1 obtained a measurement result for. In the event that MM receives a measurement request 406 from e.g. RATA LTE L1, MM may compare the measurement targets of 406 to the reported carrier frequency and/or cell identity information of 404 to identify any common measurement targets. If MM identifies common measurement targets, MM may then retrieve the measurement results for the common measurement targets from e.g. RATB GSM L1, which may e.g. involve another bi-directional signaling involving a measurement result request from MM to e.g. RATB GSM L1 and a connected measurement report from e.g. RATB GSM L1 to MM containing common measurement results. Alternatively, baseband modem 106 may provide a unified physical layer, which may be shared between one or more L1 s of RATA and RATB and allow for a substantially direct connection between e.g. RATA LTE L1 and RATB GSM L1 to exchange measurement results. Accordingly, MM may assume a supervisory role involving the direct interconnect between e.g. RATA LTE L1 and RATB GSM L1.

MM may also include a validity check to ensure that measurement results provided by e.g. RATB GSM L1 remain valid. For example, MM may assign each measurement result reported by e.g. RATB GSM L1 a validity time, and may only provide such measurement results to e.g. RATA GSM L1 if the measurement results remain valid according to the validity time. Such may ensure that mobility of mobile terminal 102 may not significantly affect the accuracy of shared measurement results.

Figure 5:
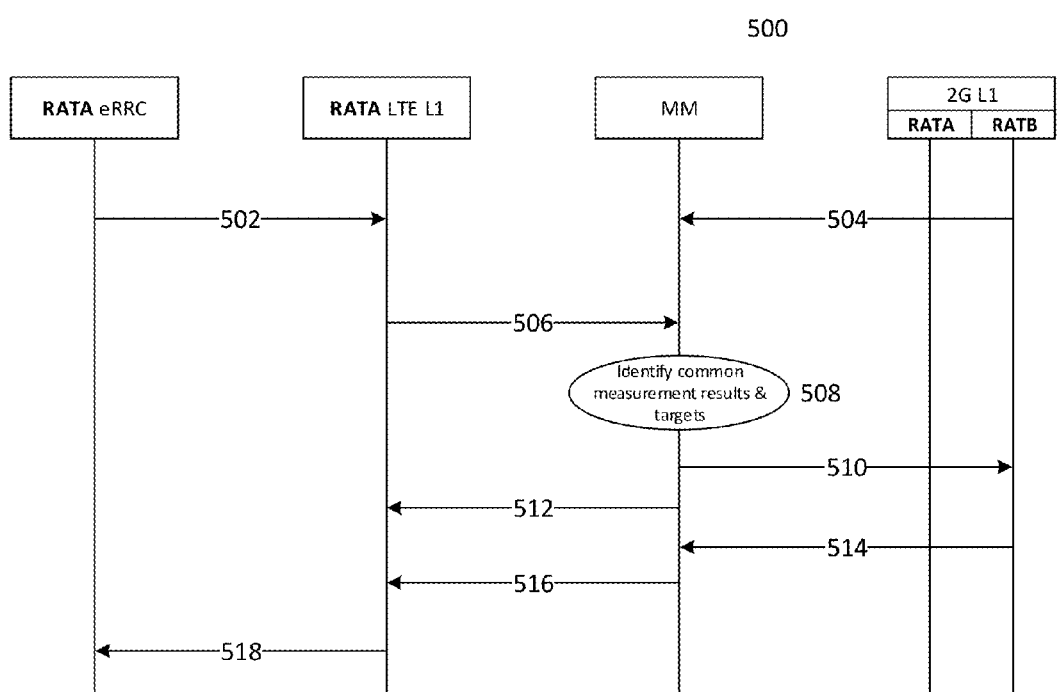
FIG. 5 shows a message sequence chart illustrating the operation of a measurement manager in a second exemplary scenario.

Depending on the measurement configuration of RATB GSM L1, some, all, or none of the first set of measurement targets requested by RATA LTE L1 may be common measurement targets to the second set of measurement targets reported by RATB GSM L1. Accordingly, FIG. 5 shows message sequence chart 500 illustrating the operation of MM in another exemplary scenario. Similarly to the exemplary scenario of message sequence chart 400, RATA LTE master may trigger inter-RAT measurements. Accordingly, the RATA LTE RRC may transmit an inter-RAT measurement request 502 to RATA LTE L1. RATA LTE L1 may transmit radio measurement request 506 to MM, which may include a first set of measurement targets including one or more GSM carrier frequencies and/or one or more specific GSM cells for which radio measurements are desired.

Upon receipt of radio measurement request 506, MM may determine whether any measurement results for the first set of measurement targets are available. Specifically, MM may determine whether RATB GSM L1 has previously reported radio measurements for any of the first set of measurement targets.

Similarly to the exemplary scenario of message sequence chart 400, RATB GSM L1 may have previously performed a radio measurements on a second set of measurement targets, which may include one or more GSM carrier frequencies and/or one or more specific GSM cells. Accordingly, RATB GSM L1 may have previously transmitted a measurement report 504 containing measurement results for the second set of measurement targets to MM.

MM may then compare the first set of measurement targets of 506 to the second set of measurement targets of 504 (or e.g. the measurement targets corresponding to the measurement results provided in 504) to identify if any common measurement targets exist at 510, i.e. if any measurement targets are included in both the first and second sets of measurement targets. MM may also identify any measurement results for the common measurement targets, such as measurement results provided in 504 (or indicated as being present at RATB GSM L1 by 504).

However, in contrast to the exemplary scenario of message sequence chart 400, only part of the first set of measurement targets requested in 506 may be common measurement targets, i.e. may be measurement targets of the second set of measurement targets reported by RATB GSM L1 in 504. Accordingly, MM may transmit a radio measurement request 510 to RATB GSM L1 specifying the remaining measurement targets, i.e. the measurement targets of the first set of measurement targets that were not included in the second set of measurement targets. MM may also transmit confirmation 512 to RATA LTE L1 indicating confirmation of radio measurement request 506.

RATB GSM L1 may then perform radio measurement on the remaining measurement targets specified by MM in 510. RATB GSM L1 may then provide measurement results for the remaining measurement targets to MM in measurement report 514. MM may then aggregate the measurement results for the common measurement targets (initially provided by RATB GSM L1 in 504) and the measurement results for the remaining measurement targets (provided by RATB GSM L1 in 514) and transmit measurement report 516 containing measurement results for all of the first set of measurement targets (composed of the common measurement targets and the remaining measurement targets) to RATA LTE L1. RATA LTE L1 may then transmit inter-RAT measurement report 518 to RATA LTE eRRC containing measurement results for the first set of measurement targets.

Similarly to the exemplary scenario of message sequence chart 400, the operation of MM may allow RATA to avoid performing inter-RAT measurements, such as by granting RATA GSM slave temporary control of reception resources, which may result in excessive power consumption and require additional reception and processing time to perform the connected inter-RAT measurements. Similarly, as opposed to initiating inter-RAT measurements by RATA GSM L1 on the remaining measurement targets (e.g. upon determination by MM with 504 and 506 that one or more of the first set of measurement targets requested by RATA LTE L1 are not included in the second set of measurement targets reported by RATB 2G L1), MM may instead instruct RATB GSM L1 to perform radio measurement on the remaining measurement targets. RATA GSM L1 may accordingly remain inactive, thus conserving power. The remaining master RAT interfaces for RATA including RATA LTE and RATA UMTS may additionally be inactive. Furthermore, measurement results for the common measurement targets may already be available via RATB GSM L1 at 504, thus reducing the amount of time needed to acquire measurement results for all of the first set of measurement targets at RATA LTE eRRC. Mobility procedures may thus be accelerated.

Figure 6:
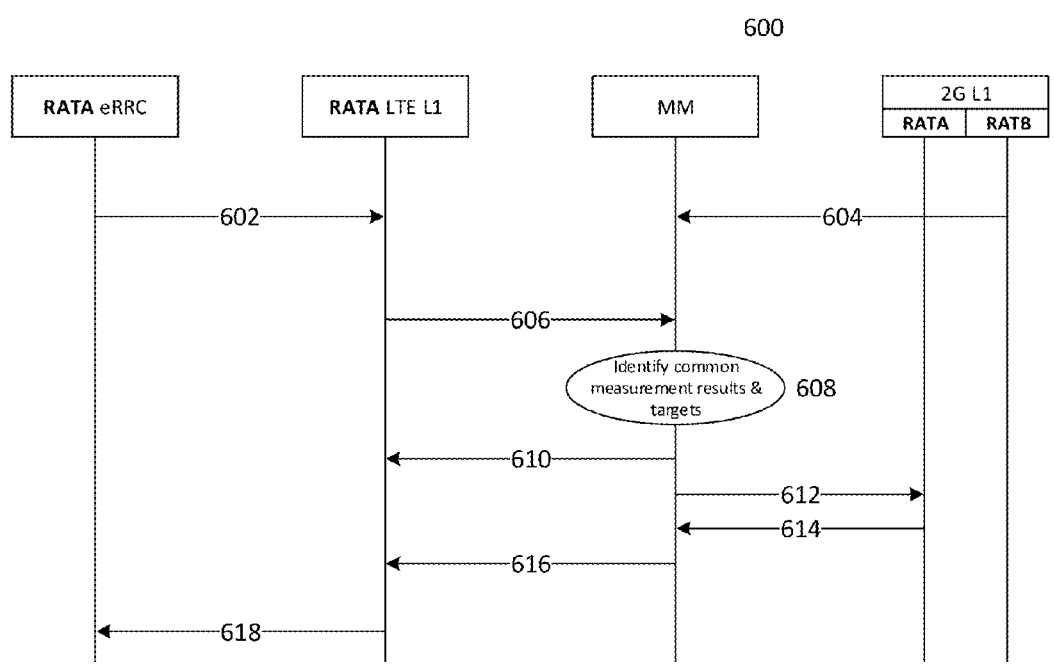
FIG. 6 shows a message sequence chart illustrating the operation of a measurement manager in a third exemplary scenario.

FIG. 6 shows message sequence chart 600 illustrating the operation of MM in another exemplary scenario. Similarly to the exemplary scenarios of message sequence charts 400 and 500, RATA LTE eRRC may trigger inter-RAT measurements by transmitting inter-RAT measurement request 602 to RATA LTE L1. RATA LTE L1 may then transmit radio measurement request 606 to MM, which may include a first set of measurement targets including one or more GSM carrier frequencies and/or one or more specific GSM cells for which radio measurements are desired.

MM may then determine whether any measurement results for the first set of measurement targets are available at 608, such as whether RATB GSM L1 has previously reported radio measurements for any of the first set of measurement targets. MM may thus compare the first set of measurement targets of 606 to the second set of measurement targets reported in 604 to identify if any common measurement targets exist at 608.

However, RATB GSM L1 may not currently be performing any radio measurements. For example, RATB GSM L1 may not currently have a DRX cycle configured (and/or e.g. any previously measurement results reported by RATB GSM L1 are invalid as will be detailed). Alternatively, RATB GSM L1 may be at the start of a DRX cycle, and accordingly may not be available to perform any radio measurements.

As RATB GSM L1 is not available to perform any radio measurements, MM may not be able to provide RATA LTE L1 with any measurement results for the first set of measurement targets. MM may then transmit confirmation 610 to RATA LTE L1 indicating the status of radio measurement request 606.

Accordingly, MM may transmit measurement request 612 to RATA GSM L1 (RATA GSM slave) to perform radio measurements for the first set of measurement targets. RATA GSM L1 may thus utilize a measurement gap or DRX cycle provided by RATA LTE L1 (RATA LTE master) to perform the intra-RAT measurements for the first set of measurement targets. RATA GSM L1 may provide the measurement results for the first set of measurement targets to MM as measurement report 614, which may provide the measurement results to RATA LTE L1 as measurement report 616. RATA LTE L1 may then provide the measurement results for the first set of measurement targets to RATA LTE eRRC as inter-RAT measurement report 618. Alternatively, RATA GSM L1 may provide the measurements results for the first set of measurement targets directly to RATA LTE L1 (i.e. not via MM) or directly to RATA LTE eRRC, e.g. through an existing upper protocol stack and physical layer interconnect.

Measurement manager MM may be implemented in numerous alternative manners. For example, instead of providing an interconnect between RATA LTE L1 and RATB GSM L1 as detailed regarding FIGS. 4-6, MM may alternatively act as an interconnect between RATA GSM L1 and RATB GSM L1. Further alternative manners are additionally recognized as possible.

Figure 7:
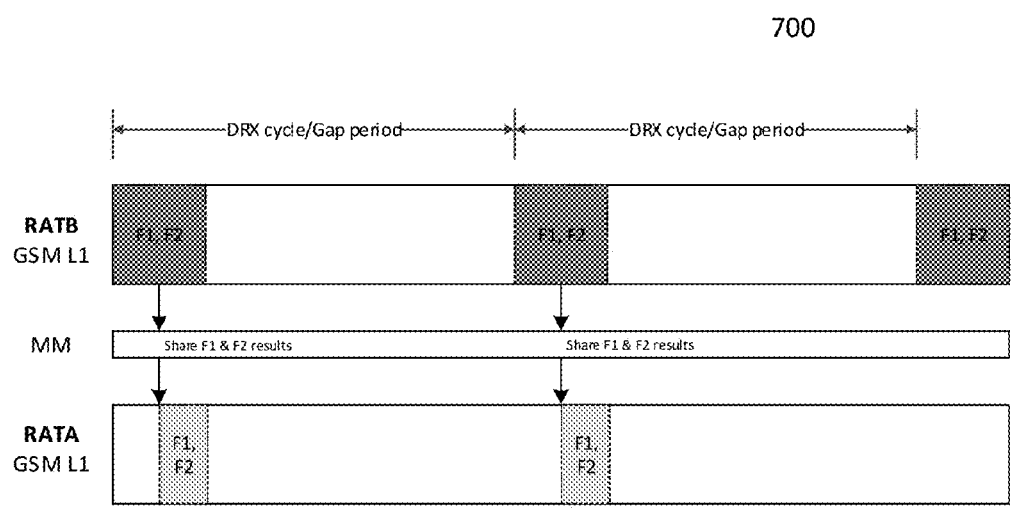
FIG. 7 shows a timing chart illustrating the operation of a measurement manager in a fourth exemplary scenario.

FIG. 7 shows timing chart 700 illustrating such an example in which MM may act as interconnect between RATA GSM L1 and RATB GSM L1. In the scenario of timing chart 700, RATB GSM L1 may be configured to perform intra- and/or inter-frequency measurements according to a Discontinuous Reception (DRX) cycle or measurement gap configuration. Accordingly, RATB GSM L1 may be configured to perform intra- and/or inter-frequency measurements according to a periodic schedule, such as a measurement gap configuration or DRX cycle provided by the mobile communication network. RATB GSM L1 may therefore perform radio measurements on a second set of measurement targets according to a set periodic schedule. As shown in FIG. 7, RATB GSM L1 may thus periodically obtain measurement results for at least carrier frequencies F1 and F2, i.e. F1 and F2 are measurement targets of the second set of measurement targets of RATB GSM L1.

Concurrently, RATA LTE master may trigger inter-RAT measurements. RATA LTE eRRC may thus transmit an inter-RAT measurement request to RATA LTE L1, which may then hand over control of reception resources to RATA GSM L1 to obtain and provide measurement results for a first set of measurement targets.

The first set of measurement targets be e.g. F1 and F2, i.e. RATA GSM L1 may need to obtain measurement results for F1 and F2. As previously detailed, RATB GSM L1 may be configured to periodically obtain measurement results for F1 and F2 according to the assigned DRX cycle or measurement gap configuration.

Accordingly, MM may configure RATB GSM L1 to provide measurement results for F1 and F2, i.e. the first set of measurement targets, when available at RATB GSM L1. Accordingly, RATB GSM L1 may obtain measurement result for F1 and F2 during each DRX cycle or measurement gap period and provide the measurement results for F1 and F2 to MM. As shown in FIG. 7, MM may then provide the measurement results to RATA GSM L1. RATA GSM L1 may then report the measurement results for F1 and F2 to RATA LTE L1 which may then provide the measurement results to RATA LTE eRRC, thus completing the inter-RAT measurement procedure.

Additionally, RATA LTE eRRC may request the inter-RAT measurements for F1 and F2 as part of a DRX cycle or measurement gap configuration, i.e. RATA LTE eRRC may periodically request the inter-RAT measurements for F1 and F2 according to a DRX cycle or measurement gap period. Accordingly, MM may continue to provide the periodically obtained F1 and F2 measurements from RATB GSM L1 to RATA GSM L1. RATA GSM L1 may therefore continuously receive periodic F1 and F2 measurements obtained by RATB GSM L1, thus eliminating the need for RATA GSM L1 to perform radio measurements.

Accordingly, MM may act as an interconnect between RATA GSM L1 and RATB GSM L1 to facilitate measurement result sharing. Additionally, MM may organize for periodic measurement result sharing between RATA and RATB e.g. in accordance with a DRX cycle or measurement gap configuration.

In the exemplary scenario detailed regarding timing chart 700, RATB GSM L1 may be configured to perform radio measurements on each of F1 and F2, i.e. the first set of measurement targets (targeted by RATA GSM L1) may be common measurement targets to the second set of measurement targets (targeted by RATB GSM L1). MM may therefore periodically retrieve measurement results for the first set of measurement targets from RATB GSM L1 and provide the measurement results to RATS GSM L1.

Figure 8:
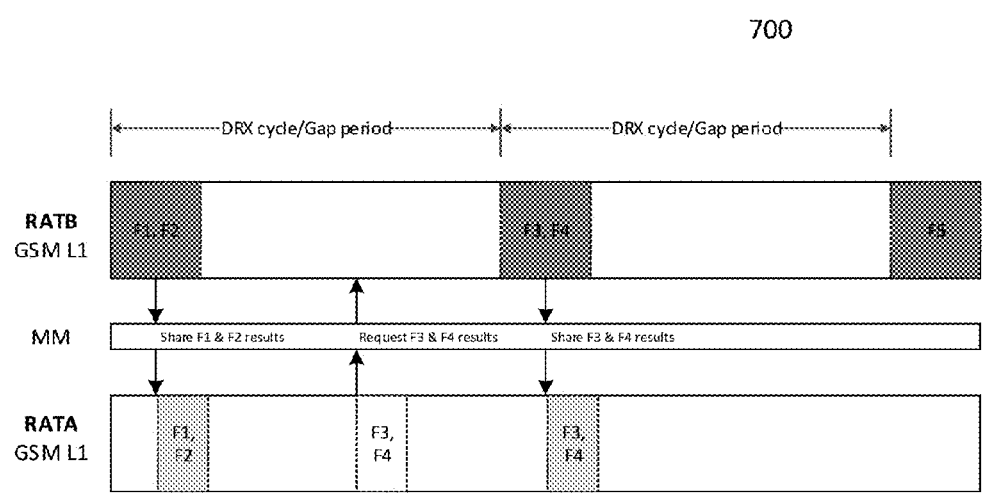
FIG. 8 shows a timing chart illustrating the operation of a measurement manager in a fifth exemplary scenario.

Such may not necessarily hold in all use cases. For example, FIG. 8 shows timing chart 800 illustrating such a scenario where only some of the first set of measurement targets may be common measurement targets.

In the exemplary scenario of timing chart 800, RATA LTE eRRC may similarly request inter-RAT measurements to RATA LTE L1. RATA GSM L1 may therefore be requested to perform radio measurements on a first set of measurement targets, e.g. carrier frequencies F1, F2, F3, and F4.

Similarly to the exemplary scenario of timing chart 700, RATB GSM L1 may be configured to perform intra- and/or inter-frequency measurements according to a DRX cycle or measurement gap configuration on a second set of measurement targets, e.g. F1, F2, and F5. Accordingly, RATB GSM L1 may periodically obtain measurement results for F1, F2, and F5 according to the DRX cycle or measurement gap period.

MM may therefore retrieve the measurement results for F1 and F2 from RATB GSM L1 and provide the measurement results to RATA GSM L1 as measurement results for common measurement targets. RATA GSM L1 may therefore obtain measurement results for F1 and F2 without having to perform radio measurement.

However, RATB GSM L1 may not be initially configured to provide measurement results for F3 and F4 to RATA GSM L1 via MM as F3 and F4 may not be common measurement targets. Accordingly, MM may identify F3 and F4 as remaining measurement targets, i.e. measurement targets of the first set of measurement targets that are not common measurement targets, such as by receiving a request from RATA GSM L1. MM may then request measurement results for F3 and F4 from RATB GSM L1.

As previously indicated, RATB GSM L1 may not be initially configured to perform radio measurements on F3 and F3 as F3 and F4 are not part of the second set of measurement targets. However, upon receipt of the request from MM, RATB GSM L1 may configure F3 and F4 as part of the measurement targets. As shown in FIG. 7, RATB GSM L1 may perform a radio measurement on F3 and F4, such as by adding F3 and F4 to the scheduled radio measurements of the DRX cycle or measurement gap configuration. RATB GSM L1 may then provide measurement results for F3 and F4 to MM, which may then provide the measurement results for F3 and F4 to RATA GSM L1. Accordingly, RATA GSM L1 may obtain measurement results for F1, F2, F3, and F4 (i.e. the first set of measurement results) without having to perform any radio measurements. RATA GSM L1 may then provide the measurement results to RATA LTE L1 which may then provide the measurement results to RATB LTE L1. Baseband modem 106 and RF transceiver 104 may thus reduce power consumption by avoiding extra radio measurements. Additionally, radio measurement completion time may be reduced.

The benefits of applying MM in the exemplary scenario of timing chart 800 may be dependent on the position of RATB GSM L1 within the DRX cycle or measurement gap period. For example, if RATA GSM L1 requests measurement results for F3 and F4 near the end of the DRX cycle or measurement gap period of RATB GSM L1, there may not exist a large latency time until RATB GSM L1 can perform the intra- and/or inter-frequency measurements in accordance with the configured DRX cycle or measurement gap pattern. Accordingly, RATA GSM L1 may not have to delay for a long period of time before receiving the requested measurement results, thus yielding greater benefits in radio measurement completion time.

However, if RATB GSM L1 is at the start of the DRX cycle or measurement gap pattern when RATA GSM L1 request the radio measurements via MM, there may exist a long delay before RATB GSM L1 is able to perform the requested radio measurements in accordance with the configured DRX cycle or measurement gap pattern. Accordingly, radio measurement completion time may be extended if RATA GSM L1 waits for RATB GSM L1 to provide the radio measurements. A similar scenario may occur when RATA GSM L1 requests radio measurements when RATB GSM L1 has not started the DRX cycle or measurement gap pattern.

Accordingly, MM may not request and wait for measurement results for remaining measurement targets from RATB GSM L1 when RATB GSM L1 has not started the DRX cycle or measurement gap pattern or is at the start of the DRX cycle or measurement gap pattern. Instead, MM may direct RATA GSM L1 to perform the radio measurements for the remaining measurement targets as opposed to relying on RATB GSM L1 to perform the radio measurements. Accordingly, RATB GSM L1 may initially provide MM with scheduling information for the DRX cycle or measurement gap pattern. MM may then determine whether RATB GSM L1 is at the start of or has not started the DRX cycle or measurement gap pattern and either provide radio measurements to RATA GSM L1 from RATB GSM L1 following a delay or instruct RATA GSM L1 to perform the radio measurements.

Figure 9A:
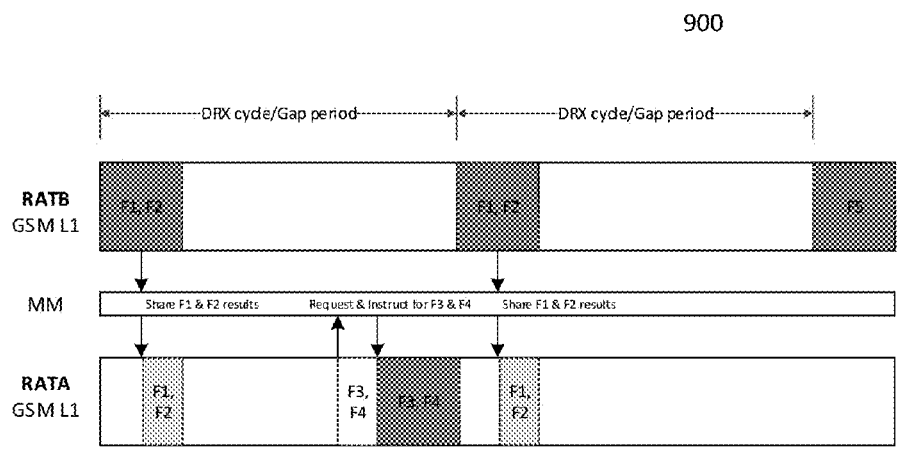
FIGS. 9A and 9B show a timing chart illustrating the operation of a measurement manager in a sixth and seventh exemplary scenario.

FIG. 9A shows timing chart 900 illustrating an exemplary scenario in which RATB GSM L1 is at the start of or has not started the DRX cycle or measurement gap pattern. Similarly to the exemplary scenario of timing chart 800, MM may request and provide measurement results for F1 and F2 (i.e. common measurement targets) from RATB GSM L1 to RATA GSM L1.

RATA GSM L1 may then additionally request measurement results for F3 and F4, i.e. the remaining measurement targets of the first set of measurement targets, e.g. by requesting from MM. However, MM may determine that RATB GSM L1 is at the start of or has not started the DRX cycle or measurement gap pattern. For example, RATB GSM L1 may provide MM with scheduling information indicating the DRX cycle or measurement gap configuration. Accordingly, MM may determine that the latency in waiting for RATB GSM L1 to be available to perform the radio measurements is excessive. Accordingly, MM may instruct RATA GSM L1 to perform the radio measurements on F3 and F4. Accordingly, RATA GSM L1 may perform the requisite radio measurements on F3 and F4, thus obtaining measurement results for all of the first set of measurement targets.

Figure 9B:
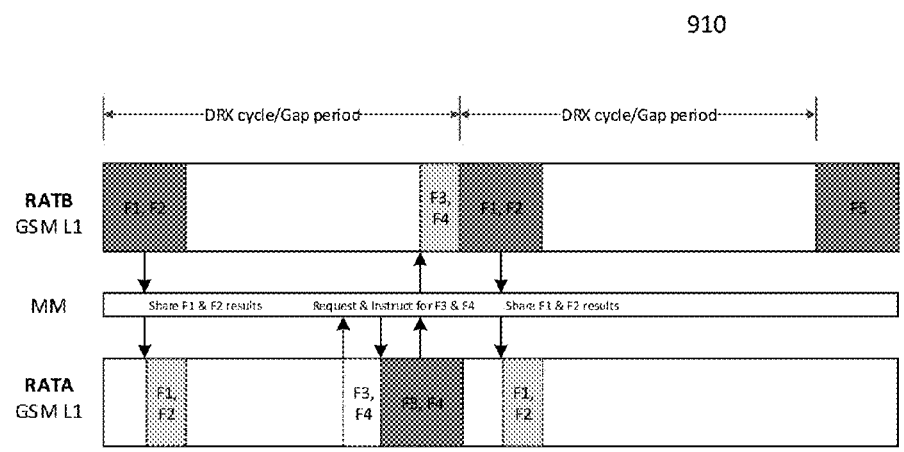

FIG. 9B shows timing chart 910 illustrating a variation on the exemplary scenario of timing chart 900. In the exemplary scenario of timing chart 910, the first set of measurement targets may be F1, F2, F3, and F4, while the second set of measurement targets may be F1, F2, F3, F4, and F5.

Similarly to the exemplary scenario of timing chart 900, MM may provide RATA GSM L1 with measurement results for F1 and F2 from RATB GSM L1 upon availability pending the DRX cycle or measurement gap pattern of RATB GM L1. RATA GSM L1 may also request measurement results for F3 and F4 from MM. As F3 and F4 are also measurement targets of the second set of measurement targets, RATB GSM L1 may be scheduled to perform radio measurement for F3 and F4. However, MM may determine that RATB is at the start of or has not started the DRX cycle or measurement gap pattern, and thus is not available to provide the radio measurements for F3 and F3 without an excessive delay.

Accordingly, MM may instruct RATA GSM L1 to perform the radio measurements for F3 and F4 and provide the radio measurements for F3 and F4 to MM. As F3 and F4 are also included in the second set of measurement targets, MM may then provide the radio measurements for F3 and F4 to RATB GSM L1. Accordingly, RATB GSM L1 may not need to perform radio measurements on F3 and F4 at a later time, and may instead utilize the measurement results for F3 and F4 provided by RATA GSM L1. Such may similarly reduce power consumption and improve radio measurement speed.

It is appreciated that the periodicity of DRX cycles and measurement gap configurations may allow for RATA and RATB to repeatedly share measurement results via MM e.g. according to the specific periods for each.

The preceding exemplary scenarios have been directed towards utilizing intra- and/or inter-frequency measurements for a first RAT interface as intra-RAT measurements for a second RAT interface, e.g. where the master RAT of the first RAT interface is different than the master RAT of the second RAT interface. However, it is appreciated that MM may similarly operate in order to share intra- and/or inter-frequency measurements between master RATs that are equivalent.

For example, SIMA and SIMB may instead each be configured to support LTE, UMTS, and GSM. In an exemplary scenario, the respective LTE interfaces of both RATA and RATB may assume the master RAT role, with UMTS and GSM assuming slave roles in both RATA and RATB.

RATA LTE master and RATB LTE master may initiate intra- and/or inter-frequency measurements e.g. during mobility procedures, where RATA LTE master may target a first set of measurement targets for radio measurement and RATB LTE master may target a second set of measurement targets for radio measurement. Similarly to as detailed above, RATA LTE master may send a radio measurement request to MM specifying the first set of measurement targets. MM may determine whether any measurement results for the first set of measurement targets are available, such as whether RATB LTE master has previously obtained and provided measurement results for any of the first set of measurement targets. If RATB LTE master has previously provided MM measurement results for any of the first set of measurement targets, e.g. by performing radio measurements on one or more common measurement targets of the second set of measurement targets, MM may provide RATA LTE master with the measurement results for the common measurement targets. MM may also determine whether any remaining measurement targets exist, i.e. whether any of the first set of measurement targets are not included in the second set of measurement targets. If so, MM may determine whether RATB LTE master is available to perform further radio measurements. If RATB LTE master is e.g. at the start of or has not started the DRX cycle or measurement gap period, MM may determine that RATB LTE master is unavailable for further measurements and may instruct RATA LTE master to perform the radio measurements on the remaining measurement targets. Alternatively, if RATB LTE master is available, MM may request that RATB LTE master perform radio measurements for the remaining measurement targets and provide any measurement results back to MM. Upon receipt thereof, MM may provide the measurement results for the remaining measurement targets back to RATA LTE master. RATA LTE master may thus not need to perform any radio measurement to obtain measurement results for the first set of measurement targets, and accordingly may reduce power consumption and improve radio measurement speed. It is appreciate that MM may act as an interconnect between certain layers of RAT interfaces RATA and RATB in such a scenario, such as between RATA LTE L1 and RATB LTE L1 or RATA LTE eRRC and RATB LTE eRRC.

Figure 10:
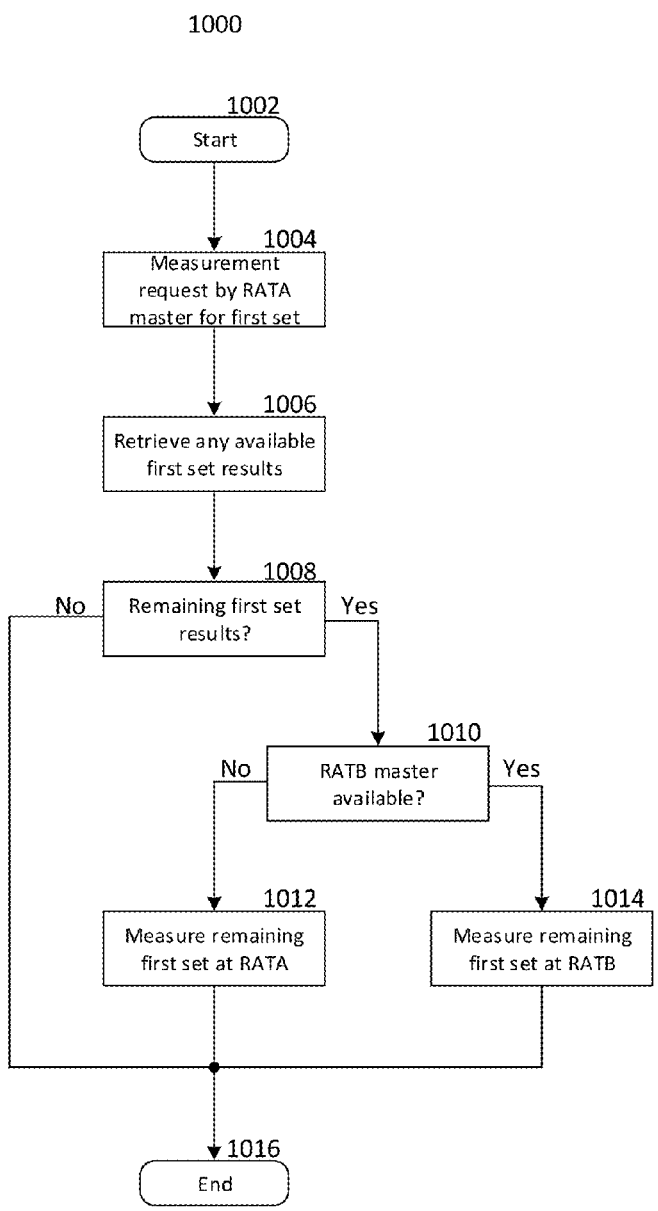
FIG. 10 shows a flow chart detailing the operation of a measurement manager.

FIG. 10 shows a flow chart illustrating method 1000 further detailing the operation of baseband modem 106 of mobile terminal 100. As previously detailed regarding FIGS. 2 and 3, RAT interfaces RATA and RATB may be implemented in baseband modem 106, such as by executing software modules corresponding to the upper protocol stack and physical layers at one or more processors (e.g. of digital processing circuit(s) 106a) in order to control operation of baseband modem 106. Similarly, MM may be implemented in baseband modem 106 by executing a software module corresponding to MM in order to interact with RAT interfaces RATA and RATB to coordinate radio measurements and share measurement results.

After initiating in 1002, RATA master (e.g. any of a LTE, UMTS, or GSM interface) may trigger a radio measurement in 1004 e.g. as part of mobility procedures. RATA master may send a radio measurement request to MM, which may indicate a first set of measurement targets for which RATA is targeting for measurement. In 1006. MM may receive the radio measurement request and retrieve any measurement results for the first set of measurement targets in 1006, such as by determining whether RATB master has previously provided or previously obtained any measurement results for the first set of measurement targets, i.e. as one more measurement results of the first set of measurement targets are common measurement targets with a second set of measurement targets of RATB master. MM may provide any available measurement results for the first set of measurement targets to RATA master, i.e. as measurement results for common measurement targets.

MM may then determine whether any remaining measurement targets exist in 1008. If no remaining measurement targets exist, method 1000 may terminate at 1016 as RATA master has obtained measurement results for all of the first set of measurement targets.

Alternatively, if remaining measurement targets exist, MM may determine in 1010 whether RATB master is available to perform further radio measurements, such as by determining whether RATB master is at the start of or has not yet started a DRX cycle or measurement gap pattern. If RATB master is not available, MM may instruct RATA master to perform the radio measurements at 1012. RATA master may therefore obtain the measurements without assistance from RATB master and method 1000 may terminate at 1016. If RATB master is available to perform radio measurements, MM may instruct RATB master to perform radio measurements for the remaining measurement targets in 1014. MM may then receive measurement results for the remaining measurement targets from RATB master and provide the measurement results to RATA master. Method 1000 may then terminate at 1016.

Accordingly, RATA may be able to obtain measurement results (e.g. intra-frequency, inter-frequency, and/or inter-RAT) without having to perform the radio measurements at either RATA master or a RATA slave, thus reducing power consumption and improving radio measurement speed. It is appreciated that the implementations detailed herein are applicable to sharing any type of radio measurement between two RAT interfaces, including intra-frequency, inter-frequency, and inter-RAT, such as by identifying any common measurement targets between RATA and RATB and sharing measurement results for the common measurement targets from one of RATA and RATB to the other.

While the above description may focus on sharing between the RAT interfaces for two SIMs, e.g. SIMA and SIMB, it is appreciated that the operations and devices detailed herein may similarly be applied to more than two SIMs. For example, MM may be configured to interact with SIMA, SIMB, and a third SIM SIMC, where MM may receive radio measurement requests from any one of RATA, RATB, or a third RAT interface corresponding to SIMC (i.e. the upper protocol stack and physical layers of each master and slave RAT of SIMC), and identify any common measurement targets and results with the other RAT interfaces. It is appreciated that the further functionality of MM detailed above may similarly be applied.

Figure 11:
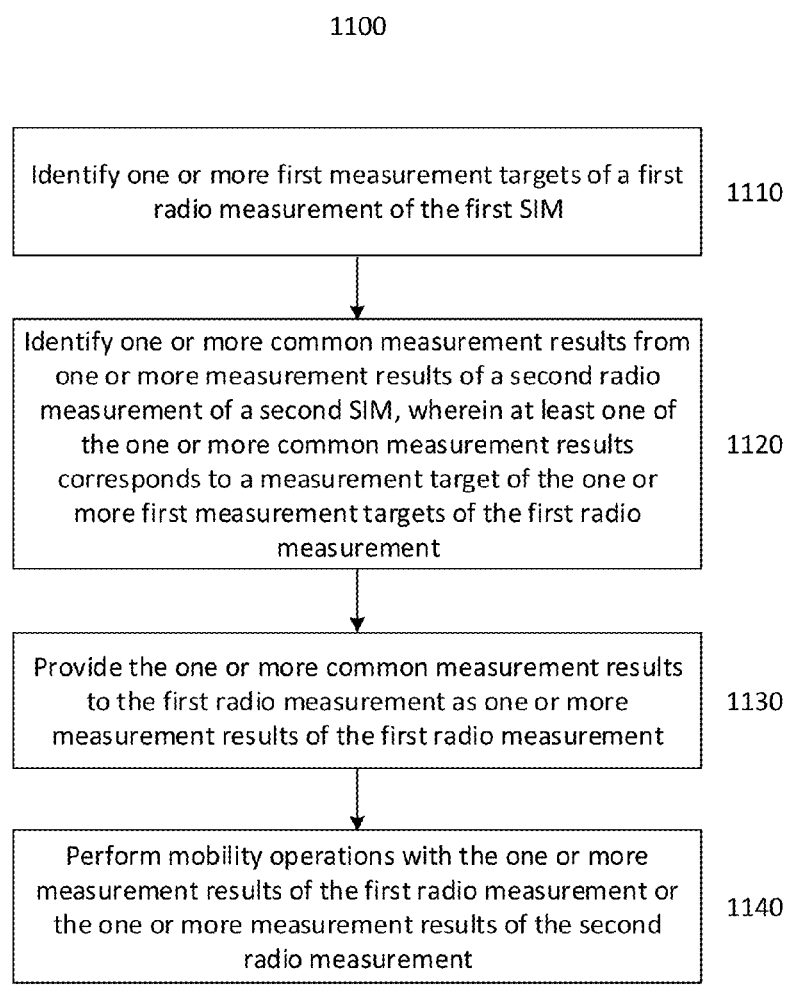
FIG. 11 shows a flow chart illustrating a first method for performing radio measurements.

FIG. 11 shows method 1100 for performing radio measurements of a first SIM. Method 1100 may include identifying one or more first measurement targets of a first radio measurement of the first SIM (1110), identifying one or more common measurement results from one or more measurement results of a second radio measurement for a second SIM (1120), wherein at least one of the one or more common measurement results corresponds to a measurement target of the one or more first measurement targets of the first radio measurement, providing the one or more common measurement results to the first radio measurement as one or more measurement results of the first radio measurement (1130), and performing mobility operations with the one or more measurement results of the first radio measurement or the one or more measurement results of the second radio measurement (1140).

In one or more further exemplary aspects of the disclosure, one or more of the features described above in reference to FIGS. 1-10 may be further incorporated into method 1100. In particular, method 1100 may be configured to perform further and/or alternate processes as detailed regarding mobile terminal 100 and/or baseband modem 106.

Figure 12:
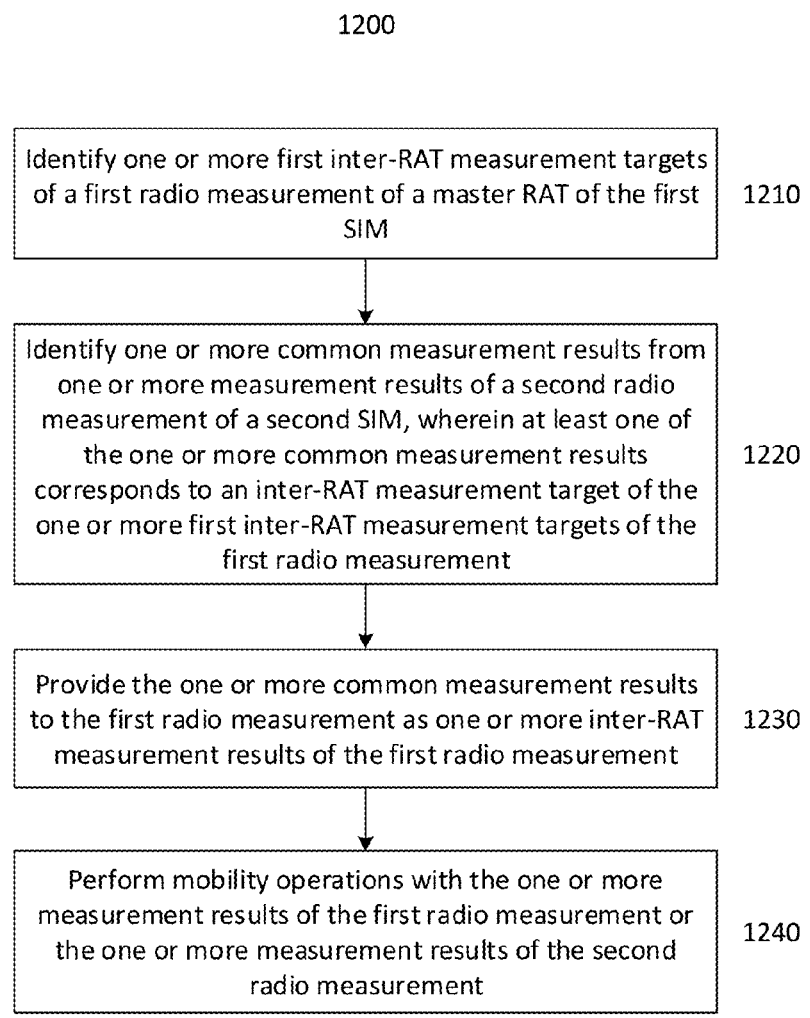
FIG. 12 shows a flow chart illustrating a second method for performing radio measurements.

FIG. 12 shows method 1200 for performing radio measurements of a first SIM. Method 1200 may include identifying one or more inter-RAT first measurement targets of a first radio measurement of a master RAT of the first SIM (1210), identifying one or more common measurement results from one or more measurement results of a second radio measurement of a second SIM (1220), wherein at least one of the one or more common measurement results corresponds to an inter-RAT measurement target of the one or more first measurement targets of the first radio measurement, providing the one or more common measurement results to the first radio measurement as one or more inter-RAT measurement results of the first radio measurement (1230), and performing mobility operations with the one or more measurement results of the first radio measurement or the one or more measurement results of the second radio measurement 1240.

In one or more further exemplary aspects of the disclosure, one or more of the features described above in reference to FIGS. 1-10 may be further incorporated into method 1200. In particular, method 1100 may be configured to perform further and/or alternate processes as detailed regarding mobile terminal 100 and/or baseband modem 106.

It is appreciated that the terms "user equipment", "UE", "mobile terminal", etc., may apply to any wireless communication device, including cellular phones, tablets, laptops, personal computers, and any number of additional electronic devices capable of wireless communications.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

All acronyms and above abbreviations defined in the above description additionally hold in all claims included herein.

The following examples pertain to further aspects of the disclosure:

Example 1 is a method for performing radio measurements of a first subscriber identity module (SIM), the method including identifying one or more first measurement targets of a first radio measurement of the first SIM, identifying one or more common measurement results from one or more measurement results of a second radio measurement of a second SIM, wherein at least one of the one or more common measurement results corresponds to a measurement target of the one or more first measurement targets of the first radio measurement, providing the one or more common measurement results to the first radio measurement as one or more measurement results of the first radio measurement, and performing mobility operations with the one or more measurement results of the first radio measurement or the one or more measurement results of the second radio measurement.

In Example 2, the subject matter of Example 1 can optionally include wherein performing mobility operations with the one or more measurement results of the first radio measurement or the one or more measurement results of the second radio measurement includes performing at least one of cell selection, cell reselection, handover, or measurement report transmission with the one or more measurement results of the first radio measurement or the one or more measurement results of the second radio measurement.

In Example 3, the subject matter of Example 1 or 2 can optionally include wherein providing the one or more common measurement results to the first radio measurement as one or more measurement results of the first radio measurement includes providing the one or more common measurement results to the first radio measurement as one or more inter-RAT measurement results of the first radio measurement.

In Example 4, the subject matter of Example 1 or 2 can optionally include wherein the first radio measurement is an inter-radio access technology (inter-RAT) radio measurement for a master RAT of the first SIM, and wherein providing the one or more common measurement results to the first radio measurement as one or more measurement results of the first radio measurement includes providing the one or more common measurement results to the first radio measurement as one or more inter-RAT measurement results of the first radio measurement.

In Example 5, the subject matter of Example 4 can optionally include wherein the second radio measurement is an intra-frequency radio measurement or an inter-frequency radio measurement of a master RAT of the second SIM, and wherein the master RAT of the first SIM is a different radio access technology than the master RAT of the second SIM.

In Example 6, the subject matter of any one of Examples 1 to 5 can optionally further include identifying one or more second measurement targets of the second radio measurement of the second SIM, and executing the second radio measurement on the one or more second measurement targets to obtain the one or more measurement results of the second radio measurement.

In Example 7, the subject matter of any one of Examples 1 to 6 can optionally include wherein the one or more first measurement targets include one or more cells targeted for measurement or one or more carrier frequencies targeted for measurement.

In Example 8, the subject matter of Example 7 can optionally include wherein performing the mobility operations with the one or more measurement results of the first radio measurement or the one or more measurement results of the second radio measurement includes performing at least one of cell selection to a cell of the one or more cells, performing cell reselection to a cell of the one or more cells, performing a handover to a cell of the one or more cells, or transmitting a measurement report for a cell of the one or more cells.

In Example 9, the subject matter of any one of Examples 1 to 5 can optionally further include identifying one or more second measurement targets of the second radio measurement, executing the second radio measurement on one or more of the first measurement targets excluded from the one or more second measurement targets to obtain one or more remaining measurement results, and providing the one or more remaining measurement results to the first radio measurement as one or more measurement results of the first radio measurement.

In Example 10, the subject matter of Example 9 can optionally further include comparing the one or more first measurement targets to the one or more second measurement targets to identify the one or more of the first measurement targets excluded from the one or more second measurement targets In Example 11, the subject matter of any one of Examples 1 to 10 can optionally include wherein the first radio measurement or the second radio measurement is a radio measurement of a DRX cycle.

In Example 12, the subject matter of any one of Examples 1 to 10 can optionally include wherein the first radio measurement or the second radio measurement is a radio measurement of a measurement gap configuration.

In Example 13, the subject matter of any one of Examples 1 to 5 can optionally further include identifying one or more second measurement targets of the second radio measurement, and upon determining that a first measurement target of the one or more first measurement targets is excluded from the one or more second measurement targets, executing the first radio measurement on the first measurement target to obtain a measurement result for the first radio measurement.

In Example 14, the subject matter of any one of Examples 1 to 5 can optionally further include identifying one or more second measurement targets of the second radio measurement, executing the first radio measurement on one or more remaining measurement targets of the one or more first measurement targets to obtain one or more remaining measurement results, wherein the one or more remaining measurement targets are excluded from the one or more second measurement targets, and providing the one or more remaining measurement results to the first radio measurement as one or more measurement results of the first radio measurement.

In Example 15, the subject matter of Example 14 can optionally include wherein the one or more measurement results of the first radio measurement include the one or more common measurement results and the one or more remaining measurement results.

In Example 16, the subject matter of Example 14 can optionally include wherein the first radio measurement is an inter-RAT measurement requested by a master RAT of the first SIM, and wherein executing the first radio measurement on one or more remaining measurement targets of the one or more first measurement targets to obtain one or more remaining measurement results includes executing the first radio measurement on the one or more remaining measurement targets of the one or more first measurement targets at a slave RAT of the first SIM.

In Example 17, the subject matter of Example 16 can optionally include wherein providing the one or more common measurement results to the first radio measurement as one or more measurement results of the first radio measurement includes providing the one or more common measurement results to the first radio measurement as one or more inter-RAT measurement results of the first radio measurement.

In Example 18, the subject matter of any one of Examples 1 to 17 can optionally include wherein the first radio measurement is a LTE radio measurement, a UMTS radio measurement, or a GSM radio measurement.

In Example 19, the subject matter of any one of Examples 1 to 18 can optionally include wherein the first radio measurement is an intra-frequency radio measurement or an inter-frequency radio measurement of a master RAT of the second SIM.

In Example 20, the subject matter of any one of Examples 1 to 19 can optionally include wherein the one or more first measurement targets include one or more LTE cells, one or more LTE carrier frequencies, one or more UMTS cells, one or more UMTS carrier frequencies, one or more GSM cells, or one or more GSM carrier frequencies.

In Example 21, the subject matter of any one of Examples 1 to 20 can optionally include wherein the one or more measurement results of the first radio measurement or the one or more measurement results of the second radio measurement include one or more signal power measurement results, one or more signal strength measurement results, or one or more signal quality measurement results.

Example 22 is a mobile terminal device including the first SIM, the second SIM, a radio processing circuit and a baseband processing circuit configured to interact with the radio processing circuit, the mobile terminal device configured to perform the method of any one of Examples 1 to 21.

Example 23 is a baseband processing circuit including one or more digital processing circuits, the one or more digital processing circuits configured to perform the method of any one of Examples 1 to 22.

Example 24 is a method for performing radio measurements of a first subscriber identity module (SIM), the method including identifying one or more first inter-RAT measurement targets of a first radio measurement of a master RAT of the first SIM, identifying one or more common measurement results from one or more measurement results of a second radio measurement of a second SIM, wherein at least one of the one or more common measurement results corresponds to an inter-RAT measurement target of the one or more first inter-RAT measurement targets of the first radio measurement, providing the one or more common measurement results to the first radio measurement as one or more inter-RAT measurement results of the first radio measurement, and performing mobility operations with the one or more measurement results of the first radio measurement or the one or more measurement results of the second radio measurement.

In Example 25, the subject matter of Example 24 can optionally include wherein performing mobility operations with the one or more measurement results of the first radio measurement or the one or more measurement results of the second radio measurement includes performing at least one of cell selection, cell reselection, handover, or measurement report transmission with the one or more measurement results of the first radio measurement or the one or more measurement results of the second radio measurement.

In Example 26, the subject matter of Example 24 or 25 can optionally include wherein the second radio measurement is a radio measurement of a master RAT of the second SIM.

In Example 27, the subject matter of any one of Examples 24 to 26 can optionally include wherein the one or more measurement results of the second radio measurement of the second SIM include one or more intra-frequency radio measurement results or one or more inter-frequency radio measurement results.

In Example 28, the subject matter of any one of Examples 24 to 27 can optionally include wherein the second radio measurement is an intra-frequency radio measurement or an inter-frequency radio measurement of a master RAT of the second SIM, and wherein the master RAT of the first SIM is a different radio access technology than the master RAT of the second SIM.

In Example 29, the subject matter of any one of Examples 24 to 28 can optionally further include identifying one or more second measurement targets of the second radio measurement of the second SIM, and executing the second radio measurement on the one or more second measurement targets to obtain the one or more measurement results of the second radio measurement.

In Example 30, the subject matter of any one of Examples 24 to 29 can optionally include wherein the one or more first inter-RAT measurement targets include one or more cells targeted for measurement or one or more carrier frequencies targeted for measurement.

In Example 31, the subject matter of Example 30 can optionally include wherein performing mobility operations with the one or more measurement results of the first radio measurement or the one or more measurement results of the second radio measurement includes performing at least one of cell selection to a cell of the one or more cells, performing cell reselection to a cell of the one or more cells, or transmitting a measurement report for a cell of the one or more cells.

In Example 32, the subject matter of any one of Examples 24 to 28 can optionally further include identifying one or more second measurement targets of the second radio measurement, executing the second radio measurement on one or more of the first inter-RAT measurement targets excluded from the one or more second measurement targets to obtain one or more remaining measurement results, and providing the one or more remaining measurement results to the first radio measurement as one or more measurement results of the first radio measurement.

In Example 33, the subject matter of Example 32 can optionally further include comparing the one or more first inter-RAT measurement targets to the one or more second measurement targets to identify the one or more of the first inter-RAT measurement targets excluded from the one or more second measurement targets.

In Example 34, the subject matter of any one of Examples 24 to 33 can optionally include wherein the first radio measurement or the second radio measurement is a radio measurement of a DRX cycle.

In Example 35, the subject matter of any one of Examples 24 to 33 can optionally include wherein the first radio measurement or the second radio measurement is a radio measurement of a measurement gap configuration.

In Example 36, the subject matter of any one of Examples 24 to 28 can optionally further include identifying one or more second measurement targets of the second radio measurement, upon determining that a first inter-RAT measurement target of the one or more first inter-RAT measurement targets is excluded from the one or more second measurement targets, executing the first radio measurement on the first inter-RAT measurement target to obtain a measurement result for the first radio measurement.

In Example 37, the subject matter of any one of Examples 24 to 28 can optionally further include identifying one or more second measurement targets of the second radio measurement, executing the first radio measurement on one or more remaining measurement targets of the one or more first measurement targets to obtain one or more remaining measurement results, wherein the one or more remaining measurement targets are excluded from the one or more second measurement targets, and providing the one or more remaining measurement results to the first radio measurement as one or more measurement results of the first radio measurement.

In Example 38, the subject matter of Example 37 can optionally include wherein the one or more measurement results of the first radio measurement include the one or more common measurement results and the one or more remaining measurement results.

In Example 39, the subject matter of Example 37 can optionally include wherein executing the first radio measurement on the one or more remaining measurement targets of the one or more first measurement targets to obtain the one or more remaining measurement results includes executing the radio measurement on the one or more remaining measurement targets of the one or more first inter-RAT measurement targets at a slave RAT of the first SIM.

In Example 40, the subject matter of any one of Examples 24 to 28 can optionally include wherein the first radio measurement is an LTE radio measurement, a UMTS radio measurement, or a GSM radio measurement.

In Example 41, the subject matter of any one of Examples 24 to 40 can optionally include wherein the first radio measurement is an intra-frequency radio measurement or an inter-frequency radio measurement of a master RAT of the second SIM.

In Example 42, the subject matter of any one of Examples 24 to 41 can optionally include wherein the one or more inter-RAT first measurement targets include one or more LTE cells, one or more LTE carrier frequencies, one or more UMTS cells, one or more UMTS carrier frequencies, one or more GSM cells, or one or more GSM carrier frequencies.

In Example 43, the subject matter of any one of Examples 24 to 42 can optionally include wherein the one or more measurement results of the first radio measurement or the one or more measurement results of the second radio measurement include one or more signal power measurement results, one or more signal strength measurement results, or one or more signal quality measurement results.

Example 44 is a mobile terminal device including the first SIM, the second SIM, a radio processing circuit, and a baseband processing circuit configured to interact with the radio processing circuit, the mobile terminal device configured to perform the method of any one of Examples 24 to 42.

Example 45 is a mobile baseband modem including one or more digital processing circuits, the one or more digital processing circuits configured to perform the method of any one of Examples 24 to 42.

Example 46 is a mobile terminal device including a first SIM, a second SIM, a radio processing circuit and a baseband processing circuit configured to interact with the radio processing circuit, the baseband processing circuit configured to identify one or more first measurement targets of a first radio measurement of the first SIM, identify one or more common measurement results from one or more measurement results of a second radio measurement of the second SIM, wherein at least one of the one or more common measurement results corresponds to a measurement target of the one or more first measurement targets of the first radio measurement, provide the one or more common measurement results to the first radio measurement as one or more measurement results of the first radio measurement, and perform mobility operations with the one or more measurement results of the first radio measurement or the one or more measurement results of the second radio measurement.

In Example 47, the subject matter of Example 46 can optionally include wherein the radio processing circuit is configured to process radio frequency signals and provide the radio frequency signals as baseband signals to the baseband processing circuit.

In Example 48, the subject matter of Example 46 can optionally further include an antenna configured to receive wireless signals and provide the wireless signals as radio frequency signals to the radio processing circuit.

In Example 49, the subject matter of Example 46 can optionally include wherein performing mobility operations with the one or more measurement results of the first radio measurement or the one or more measurement results of the second radio measurement includes performing at least one of cell selection, cell reselection, handover, or measurement report transmission with the one or more measurement results of the first radio measurement or the one or more measurement results of the second radio measurement.

In Example 50, the subject matter of Example 49 can optionally include wherein the baseband processing circuit is configured to execute a protocol stack in order to control the mobility operations.

In Example 51, the subject matter of any one of Examples 46 to 50 can optionally include wherein providing the one or more common measurement results to the first radio measurement as one or more measurement results of the first radio measurement includes providing the one or more common measurement results to the first radio measurement as one or more inter-RAT measurement results of the first radio measurement.

In Example 52, the subject matter of any one of Examples 46 to 50 can optionally include wherein the first radio measurement is an inter-RAT radio measurement of a master RAT of the first SIM, and wherein providing the one or more common measurement results to the first radio measurement as one or more measurement results of the first radio measurement includes providing the one or more common measurement results to the first radio measurement as one or more inter-RAT measurement results of the first radio measurement.

In Example 53, the subject matter of Example 52 can optionally include wherein the second radio measurement is an intra-frequency or inter-frequency radio measurement of a master RAT of the second SIM, and wherein the master RAT of the first SIM is a different radio access technology than the master RAT of the second SIM.

In Example 54, the subject matter of any one of Examples 46 to 53 can optionally include wherein the baseband processing circuit is further configured to provide one or more second measurement targets of the second radio measurement of the second SIM, and execute the second radio measurement on the one or more second measurement targets to obtain the one or more measurement results of the second radio measurement.

In Example 55, the subject matter of any one of Examples 46 to 54 can optionally include wherein the one or more first measurement targets include one or more cells targeted for measurement or one or more carrier frequencies targeted for measurement.

In Example 56, the subject matter of Example 55 can optionally include wherein performing the mobility operations with the one or more measurement results of the first radio measurement or the one or more measurement results of the second radio measurement includes performing at least one of cell selection to a cell of the one or more cells, performing cell reselection to a cell of the one or more cells, performing a handover to a cell of the one or more cells, or transmitting a measurement report for a cell of the one or more cells.

In Example 57, the subject matter of any one of Examples 46 to 53 can optionally include wherein the baseband processing circuit is further configured to provide one or more second measurement targets of the second radio measurement, execute the second radio measurement on one or more of the first measurement targets excluded from the one or more second measurement targets to obtain one or more remaining measurement results, and provide the one or more remaining measurement results to the first radio measurement as one or more measurement results of the first radio measurement.

In Example 58, the subject matter of Example 57 can optionally include wherein the baseband processing circuit is further configured to compare the one or more first measurement targets to the one or more second measurement targets to identify the one or more of the first measurement targets that are excluded from the one or more second measurement targets.

In Example 59, the subject matter of any one of Examples 46 to 58 can optionally include wherein the first radio measurement or the second radio measurement is a radio measurement of a DRX cycle.

In Example 60, the subject matter of any one of Examples 46 to 58 can optionally include wherein the first radio measurement or the second radio measurement is a radio measurement of a measurement gap configuration.

In Example 61, the subject matter of any one of Examples 46 to 53 can optionally include wherein the baseband processing circuit is further configured to provide one or more second measurement targets of the second radio measurement, upon determining that a first measurement target of the one or more first measurement targets is excluded from the one or more second measurement targets, execute the first radio measurement on the first measurement target to obtain a measurement result for the first radio measurement.

In Example 62, the subject matter of any one of Examples 46 to 53 can optionally include wherein the baseband processing circuit is further configured to provide one or more second measurement targets of the second radio measurement, execute the first radio measurement on one or more remaining measurement targets of the one or more first measurement targets to obtain one or more remaining measurement results, wherein the one or more remaining measurement targets are excluded from the one or more second measurement targets, and provide the one or more remaining measurement results to the first radio measurement as one or more measurement results of the first radio measurement.

In Example 63, the subject matter of Example 62 can optionally include wherein the one or more measurement results of the first radio measurement include the one or more common measurement results and the one or more remaining measurement results.

In Example 64, the subject matter of Example 62 can optionally include wherein the first radio measurement is an inter-RAT measurement requested by a master RAT of the first SIM, and wherein executing the first radio measurement on one or more remaining measurement targets of the one or more first measurement targets to obtain one or more remaining measurement results includes executing the first radio measurement on the one or more remaining measurement targets of the one or more first measurement targets at a slave RAT of the first SIM.

In Example 65, the subject matter of Example 64 can optionally include wherein providing the one or more common measurement results to the first radio measurement as one or more measurement results of the first radio measurement includes providing the one or more common measurement results to the first radio measurement as one or more inter-RAT measurement results of the first radio measurement.

In Example 66, the subject matter of any one of Examples 46 to 65 can optionally include wherein the first radio measurement is a Long Term Evolution (LTE) radio measurement, a Universal Mobile Telecommunications System (UMTS) radio measurement, or a Global System for Mobile Communications (GSM) radio measurement.

In Example 67, the subject matter of any one of Examples 46 to 66 can optionally include wherein the first radio measurement is an intra-frequency or an inter-frequency radio measurement for a master RAT of the second SIM.

In Example 68, the subject matter of any one of Examples 46 to 67 can optionally include wherein the one or more first measurement targets include one or more LTE cells, one or more LTE carrier frequencies, one or more UMTS cells, one or more UMTS carrier frequencies, one or more GSM cells, or one or more GSM carrier frequencies.

In Example 69, the subject matter of any one of Examples 46 to 68 can optionally include wherein the one or more measurement results of the first radio measurement or the one or more measurement results of the second radio measurement include one or more signal power measurement results, one or more signal strength measurement results, or one or more signal quality measurement results.

In Example 70, the subject matter of any one of Examples 46 to 69 can optionally include configured according to a multi-SIM design that allows the first SIM and the second SIM to concurrently receive data.

In Example 71, the subject matter of Example 70 can optionally include configured according to a Dual-Receive Dual-Sim Dual-Standby (DR-DSDS) or a Dual-Sim Dual-Active (DSDA) design.

Example 72 is a mobile terminal device including a first SIM, a second SIM, a radio processing circuit and a baseband processing circuit configured to interact with the radio processing circuit, the baseband processing circuit configured to identify one or more first inter-RAT measurement targets of a first radio measurement of a master RAT of the first SIM, identify one or more common measurement results from one or more measurement results of a second radio measurement of the second SIM, wherein at least one of the one or more common measurement results corresponds to a measurement target of the one or more first measurement targets of the first radio measurement, provide the one or more common measurement results to the first radio measurement as one or more inter-RAT measurements results of the first radio measurement, and perform mobility operations with the one or more measurement results of the first radio measurement or the one or more measurement results of the second radio measurement.

In Example 73, the subject matter of Example 72 can optionally include wherein the radio processing circuit is configured to process radio frequency signals and provide the radio frequency signals as baseband signals to the baseband processing circuit.

In Example 74, the subject matter of Example 72 can optionally further include an antenna configured to receive wireless signals and provide the wireless signals as radio frequency signals to the radio processing circuit.

In Example 75, the subject matter of Example 72 can optionally include wherein performing mobility operations with the one or more measurement results of the first radio measurement or the one or more measurement results of the second radio measurement includes performing at least one of cell selection, cell reselection, handover, or measurement report transmission with the one or more measurement results of the first radio measurement or the one or more measurement results of the second radio measurement.

In Example 76, the subject matter of Example 75 can optionally include wherein the baseband processing circuit is configured to execute a protocol stack in order to control the mobility operations.

In Example 77, the subject matter of any one of Examples 72 to 77 can optionally include wherein the second radio measurement is a radio measurement of a master RAT of the second SIM.

In Example 78, the subject matter of any one of Examples 72 to 77 can optionally include wherein the measurement results of the second radio measurement of the second SIM include one or more intra-frequency radio measurement results or one or more inter-frequency radio measurement results.

In Example 79, the subject matter of any one of Examples 72 to 78 can optionally include wherein the second radio measurement is an intra-frequency or an inter-frequency radio measurement of a master RAT of the second SIM, and wherein the master RAT of the first SIM is a different radio access technology than the master RAT of the second SIM.

In Example 80, the subject matter of any one of Examples 72 to 79 can optionally include wherein the baseband processing circuit is further configured to identify one or more second measurement targets of the second radio measurement of the second SIM, and execute the second radio measurement on the one or more second measurement targets to obtain the one or more measurement results of the second radio measurement.

In Example 81, the subject matter of any one of Examples 72 to 80 can optionally include wherein the one or more first measurement targets include one or more cells targeted for measurement or one or more carrier frequencies targeted for measurement.

In Example 82, the subject matter of Example 81 can optionally include wherein performing mobility operations with the one or more measurement results of the first radio measurement or the one or more measurement results of the second radio measurement includes performing at least one of cell selection to a cell of the one or more cells, performing cell reselection to a cell of the one or more cells, performing handover to a cell of the one or more cells, or transmitting a measurement report for a cell of the one or more cells.

In Example 83, the subject matter of any one of Examples 72 to 79 can optionally include wherein the baseband processing circuit is further configured to identify one or more second measurement targets of the second radio measurement, execute the second radio measurement on one or more of the first radio measurement targets excluded from the one or more second measurement targets to obtain one or more remaining measurement results, and provide the one or more remaining measurement results to the first radio measurement as one or more measurement results of the first radio measurement.

In Example 84, the subject matter of Example 83 can optionally include wherein the baseband processing circuit is further configured to compare the one or more first measurement targets to the one or more second measurement targets to identify the one or more of the first measurement targets excluded from the one or more second measurement targets.

In Example 85, the subject matter of any one of Examples 72 to 84 can optionally include wherein the first radio measurement or the second radio measurement is a radio measurement of a Discontinuous Reception (DRX) cycle.

In Example 86, the subject matter of any one of Examples 72 to 84 can optionally include wherein the first radio measurement or the second radio measurement is a radio measurement of a measurement gap configuration.

In Example 87, the subject matter of any one of Examples 72 to 79 can optionally include wherein the baseband processing circuit is further configured to identify one or more second measurement targets of the second radio measurement, upon determining that a first measurement target of the one or more first measurement targets is excluded from the one or more second measurement targets, execute the first radio measurement on the first measurement target to obtain a measurement result for the first radio measurement.

In Example 88, the subject matter of any one of Examples 72 to 79 can optionally include wherein the baseband processing circuit is further configured to identify one or more second measurement targets of the second radio measurement, execute the first radio measurement on one or more remaining measurement targets of the one or more first measurement targets to obtain one or more remaining measurement results, wherein the one or more remaining measurement targets are excluded from the one or more second measurement targets, and provide the one or more remaining measurement results to the first radio measurement as one or more measurement results of the first radio measurement.

In Example 89, the subject matter of Example 88 can optionally include wherein the one or more measurement results of the first radio measurement include the one or more common measurement results and the one or more remaining measurement results.

In Example 90, the subject matter of Example 88 can optionally include wherein executing the first radio measurement on the one or more remaining measurement targets of the one or more first measurement targets to obtain the one or more remaining measurement results includes executing the radio measurement on the one or more remaining measurement targets of the one or more first measurement targets at a slave RAT of the first SIM.

In Example 91, the subject matter of any one of Examples 72 to 90 can optionally include wherein the first radio measurement is an LTE radio measurement, a UMTS radio measurement, or a GSM radio measurement.

In Example 92, the subject matter of any one of Examples 72 to 90 can optionally include wherein the first radio measurement is an intra-frequency radio measurement or an inter-frequency radio measurement for a master RAT of the second SIM.

In Example 93, the subject matter of any one of Examples 72 to 92 can optionally include wherein the one or more first measurement targets include one or more LTE cells, one or more LTE carrier frequencies, one or more UMTS cells, one or more UMTS carrier frequencies, one or more GSM cells, or one or more GSM carrier frequencies.

In Example 94, the subject matter of any one of Examples 72 to 93 can optionally include wherein the one or more measurement results of the first radio measurement or the one or more measurement results of the second radio measurement include one or more signal power measurement results, one or more signal strength measurement results, or one or more signal quality measurement results.

In Example 95, the subject matter of any one of Examples 72 to 93 can optionally include configured according to a multi-SIM design that allows the first SIM and the second SIM to concurrently receive data.

In Example 96, the subject matter of Example 95 can optionally include configured according to a DR-DSDS or a DSDA design.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device comprising a first subscriber identity module (SIM), a second SIM, a radio processing circuit and a baseband processing circuit configured to interact with the radio processing circuit, the baseband processing circuit configured to:
   obtain one or more measurement results of a second radio measurement for a second SIM prior to identifying one or more first inter-radio access technology measurement targets of a first radio measurement of the first SIM;
   identify one or more first inter-radio access technology (inter-RAT) measurement targets of the first radio measurement of a master RAT of the first SIM;
   compare the one or more first inter-RAT measurement targets of the first radio measurement of the first SIM to the one or more measurement results of the second radio measurement of the second SIM;
   identify one or more measurement results of the second radio measurement of the second SIM that is common to the one or more first inter-RAT measurement targets of the first radio measurement of the first SIM;
   provide the one or more common measurement results to the first radio measurement as one or more inter-RAT measurements results of the first radio measurement for the first SIM;
   perform a second radio measurement of the second SIM for any of the one or more first inter-RAT remaining measurement targets not provided by the second radio measurement;
   provide one or more first inter-RAT measurement results of the one or more inter-RAT remaining measurement targets from the second SIM to the first SIM; and
   perform mobility operations with the one or more measurement results of the first radio measurement or the one or more measurement results of the second radio measurement.

2. The mobile terminal device of claim 1, wherein performing mobility operations with the one or more measurement results of the first radio measurement or the one or more measurement results of the second radio measurement comprises performing at least one of cell selection, cell reselection, handover, or measurement report transmission with the one or more measurement results of the first radio measurement or the one or more measurement results of the second radio measurement.

3. The mobile terminal device of claim 1, wherein the second radio measurement is a radio measurement of a master RAT of the second SIM.

4. The mobile terminal device of claim 1, wherein the measurement results of the second radio measurement of the second SIM comprise one or more intra-frequency radio measurement results or one or more inter-frequency radio measurement results.

5. The mobile terminal device of claim 1, wherein the second radio measurement is an intra-frequency or an inter-frequency radio measurement of a master RAT of the second SIM, and wherein the master RAT of the first SIM is a different radio access technology than the master RAT of the second SIM.

6. The mobile terminal device of claim 1, wherein the baseband processing circuit is further configured to:
   identify one or more second measurement targets of the second radio measurement of the second SIM; and
   execute the second radio measurement on the one or more second measurement targets to obtain the one or more measurement results of the second radio measurement.

7. The mobile terminal device of claim 1, wherein the one or more first measurement targets comprise one or more cells targeted for measurement or one or more carrier frequencies targeted for measurement.

8. The mobile terminal device of claim 7, wherein performing mobility operations with the one or more measurement results of the first radio measurement or the one or more measurement results of the second radio measurement comprises performing at least one of cell selection to a cell of the one or more cells, performing cell reselection to a cell of the one or more cells, performing handover to a cell of the one or more cells, or transmitting a measurement report for a cell of the one or more cells.

9. The mobile terminal device of claim 1, wherein the baseband processing circuit is further configured to:
   identify one or more second measurement targets of the second radio measurement;
   execute the second radio measurement on one or more of the first radio measurement targets excluded from the one or more second measurement targets to obtain one or more remaining measurement results; and
   provide the one or more remaining measurement results to the first radio measurement as one or more measurement results of the first radio measurement.

10. A method for performing radio measurements of a first subscriber identity module (SIM), the method comprising:
    obtaining one or more measurement results of a second radio measurement for a second SIM prior to identifying one or more first measurement targets of a first radio measurement of the first SIM;
    comparing the one or more measurement results of the second radio measurement of the second SIM to one or more first measurement targets of a first radio measurement of the first SIM;
    identifying the one or more measurement results of the second radio measurement of the second SIM that is common to the one or more first measurement targets of the first radio measurement of the first SIM;
    providing the one or more common measurement results to the first radio measurement as one or more measurement results of the first radio measurement;
    perform a second radio measurement of the second SIM for any of the one or more first remaining measurement targets not provided by the second radio measurement;
    provide one or more first measurement results of the one or more remaining measurement targets from the second SIM to the first SIM; and
    performing mobility operations with the one or more measurement results of the first radio measurement or the one or more measurement results of the second radio measurement.

11. The method of claim 10, wherein performing mobility operations with the one or more measurement results of the first radio measurement or the one or more measurement results of the second radio measurement comprises performing at least one of cell selection, cell reselection, handover, or measurement report transmission with the one or more measurement results of the first radio measurement or the one or more measurement results of the second radio measurement.

12. The method of claim 10, wherein providing the one or more common measurement results to the first radio measurement as one or more measurement results of the first radio measurement comprises:
    providing the one or more common measurement results to the first radio measurement as one or more inter-RAT measurement results of the first radio measurement.

13. The method of claim 10, wherein the first radio measurement is an inter-radio access technology (inter-RAT) radio measurement for a master RAT of the first SIM, and wherein providing the one or more common measurement results to the first radio measurement as one or more measurement results of the first radio measurement comprises:
    providing the one or more common measurement results to the first radio measurement as one or more inter-RAT measurement results of the first radio measurement.

14. The method of claim 13, wherein the second radio measurement is an intra-frequency radio measurement or an inter-frequency radio measurement of a master RAT of the second SIM, and wherein the master RAT of the first SIM is a different radio access technology than the master RAT of the second SIM.

15. The method of claim 10, further comprising:
    identifying one or more second measurement targets of the second radio measurement of the second SIM; and
    executing the second radio measurement on the one or more second measurement targets to obtain the one or more measurement results of the second radio measurement.

16. The method of claim 10, wherein the one or more first measurement targets comprise one or more cells targeted for measurement or one or more carrier frequencies targeted for measurement.

17. The method of claim 16, wherein performing the mobility operations with the one or more measurement results of the first radio measurement or the one or more measurement results of the second radio measurement comprises performing at least one of cell selection to a cell of the one or more cells, performing cell reselection to a cell of the one or more cells, performing a handover to a cell of the one or more cells, or transmitting a measurement report for a cell of the one or more cells.

18. The method of claim 10, further comprising:
    identifying one or more second measurement targets of the second radio measurement;
    executing the second radio measurement on one or more of the first measurement targets excluded from the one or more second measurement targets to obtain one or more remaining measurement results; and
    providing the one or more remaining measurement results to the first radio measurement as one or more measurement results of the first radio measurement.

19. The method of claim 10, wherein the first radio measurement is an intra-frequency radio measurement or an inter-frequency radio measurement of a master RAT of the second SIM.

20. A method for performing radio measurements of a first subscriber identity module (SIM), the method comprising:
    obtaining one or more measurement results of a second radio measurement for a second SIM prior to identifying one or more first inter-RAT measurement targets of a first radio measurement of a master RAT of the first SIM;

comparing the one or more measurement results of the second radio measurement of the second SIM to one or more first inter-RAT measurement targets of a first radio measurement of the first SIM;

identifying the one or more measurement results of the second radio measurement of the second SIM that is common to the one or more first inter-RAT measurement targets of the first radio measurement of the first SIM;

providing the one or more common measurement results to the first radio measurement as one or more inter-RAT measurement results of the first radio measurement;

performing a second radio measurement of the second SIM for any of the one or more first inter-RAT remaining measurement targets not provided by the second radio measurement;

providing one or more first inter-RAT measurement results of the one or more inter-RAT remaining measurement targets from the second SIM to the first SIM, and performing mobility operations with the one or more measurement results of the first radio measurement or the one or more measurement results of the second radio measurement.

21. The method of claim 20, wherein performing mobility operations with the one or more measurement results of the first radio measurement or the one or more measurement results of the second radio measurement comprises performing at least one of cell selection, cell reselection, handover, or measurement report transmission with the one or more measurement results of the first radio measurement or the one or more measurement results of the second radio measurement.

22. The method of claim 20, wherein the one or more measurement results of the second radio measurement of the second SIM comprise one or more intra-frequency radio measurement results or one or more inter-frequency radio measurement results.

23. A mobile terminal device comprising a first SIM, a second SIM, a radio processing circuit and a baseband processing circuit configured to interact with the radio processing circuit, the baseband processing circuit configured to:

obtain one or more measurement results of a second radio measurement of a second SIM prior to identifying one or more first measurement targets of a first radio measurement of the first SIM;

identify one or more first measurement targets of the first radio measurement of the first SIM;

compare the one or more first measurement targets of the first radio measurement of the first SIM to the one or more measurement results of the second radio measurement of the second SIM;

identify one or more measurement results of the second radio measurement of the second SIM that is common to the one or more first measurement targets of the first radio measurement of the first SIM;

provide the one or more common measurement results to the first radio measurement as one or more measurement results of the first radio measurement for the first SIM;

perform a second radio measurement of the second SIM for any of the one or more first remaining measurement targets not provided by the second radio measurement;

provide one or more first measurement results of the one or more remaining measurement targets from the second SIM to the first SIM; and perform mobility operations with the one or more measurement results of the first radio measurement or the one or more measurement results of the second radio measurement.

24. The mobile terminal device of claim 23, wherein performing mobility operations with the one or more measurement results of the first radio measurement or the one or more measurement results of the second radio measurement comprises performing at least one of cell selection, cell reselection, handover, or measurement report transmission with the one or more measurement results of the first radio measurement or the one or more measurement results of the second radio measurement.

* * * * *